US008429689B2

(12) United States Patent
Nishimura et al.

(10) Patent No.: US 8,429,689 B2
(45) Date of Patent: Apr. 23, 2013

(54) PROGRAM DATA PROCESSING METHOD AND APPARATUS

(75) Inventors: Koji Nishimura, Tokyo (JP); Shinichiro Sugai, Saitama (JP); Yukinori Kita, Tokyo (JP); Makoto Korehisa, Kanagawa (JP); Takahiko Yaginuma, Tokyo (JP); Tomoko Terakado, Kanagawa (JP); Kenji Hamamoto, Tokyo (JP)

(73) Assignee: Sony Corporation (JP)

( * ) Notice: Subject to any disclaimer, the term of this patent is extended or adjusted under 35 U.S.C. 154(b) by 1347 days.

(21) Appl. No.: 10/841,868

(22) Filed: May 7, 2004

(65) Prior Publication Data
US 2005/0028205 A1 Feb. 3, 2005

(30) Foreign Application Priority Data

May 7, 2003 (JP) ................. P2003-167156

(51) Int. Cl.
*G06F 3/00* (2006.01)
(52) U.S. Cl.
USPC .......................................................... 725/46
(58) Field of Classification Search .............. 725/46, 725/49, 58; 370/433
See application file for complete search history.

(56) References Cited

U.S. PATENT DOCUMENTS

| 5,579,055 | A | * | 11/1996 | Hamilton et al. | 725/49 |
| 5,666,645 | A | * | 9/1997 | Thomas et al. | 725/47 |
| 5,808,694 | A | * | 9/1998 | Usui et al. | 725/49 |
| 6,005,562 | A | * | 12/1999 | Shiga et al. | 715/721 |
| 6,018,372 | A | * | 1/2000 | Etheredge | 725/44 |
| 6,020,880 | A | * | 2/2000 | Naimpally | 725/48 |
| 6,160,546 | A | * | 12/2000 | Thompson et al. | 715/721 |
| 6,177,931 | B1 | * | 1/2001 | Alexander et al. | 725/52 |
| 6,405,372 | B1 | * | 6/2002 | Kim et al. | 725/50 |
| 6,442,757 | B1 | * | 8/2002 | Hancock et al. | 725/50 |
| 6,904,609 | B1 | * | 6/2005 | Pietraszak et al. | 725/39 |
| 7,657,916 | B2 | * | 2/2010 | Rodriguez et al. | 725/115 |
| 2002/0092020 | A1 | * | 7/2002 | Voyer et al. | 725/39 |
| 2002/0174430 | A1 | * | 11/2002 | Ellis et al. | 725/46 |
| 2002/0184650 | A1 | * | 12/2002 | Stone | 725/131 |

FOREIGN PATENT DOCUMENTS

| JP | 11-232725 A | 8/1999 |
| JP | 2000-287147 A | 10/2000 |
| JP | 2000-295554 A | 10/2000 |
| JP | 2001-016515 A | 1/2001 |
| JP | 2002-252815 A | 9/2002 |
| JP | 2003-078851 A | 3/2003 |

\* cited by examiner

*Primary Examiner* — Vivek Srivastava
*Assistant Examiner* — Alfonso Castro
(74) *Attorney, Agent, or Firm* — Lerner, David, Littenberg, Krumholz & Mentlik, LLP

(57) ABSTRACT

A process for performing video recording and the like after obtaining electronic program data is optimized. According to the process, only program data relating to one or more predetermined preset channels of the channels which are broadcast by a broadcast service are separated from program data which guide programs broadcast by a predetermined broadcast service. Only program data relating to a predetermined channel are stored, and processes of video recording and the like can be performed according to the stored program data.

15 Claims, 22 Drawing Sheets

Example for EPG data obtaining process

Example of setup process

Process example for changing-over program table obtaining CH

Example for EPG data obtaining process

Example of ground wave program-list obtaining process

Example of CS program-list obtaining process

Example of ground wave CH setting

Example of ground wave CH confirmation

Example of setting auto. vedeo-REC. ground wave CH

Example of CS CH setting

FIG. 15

Setup — CH Confirmation & Setting

| Receiv. CH | Name of Broadcast Station | Sattelite |
|---|---|---|
| 123 | Sky-Channel | Service B |
| 223 | Family-Channel | Service B |
| 323 | Super-Circuit | Service A |
| 423 | Blue-Channel | Service A |
| 523 | Satellite Broadcast of XX-University Campus | Service A |
| 623 | Table Tennis 276 | Service A |
| 723 | Channel | Service B |
| 823 | ABC Channel | Service B |

⇧⇩ for Select. & (DETERMINE) for Determine.　(LIVE) for Finish.

Example of CS CH confirming picture screen

FIG. 16

| Setup | | |
|---|---|---|
| Auto. Video-REC. CH Intended/Non-Intended | | |
| Receiv. CH | Name of Broadcast Station | Auto. Video-REC |
| 123 | Sky-Channel | Yes |
| 223 | Family-Channel | No |
| 323 | Super-Circuit | Yes |
| 423 | Blue-Channel | No |
| 523 | Satellite Broadcast of XX-University Campus | Yes |
| 623 | Table Tennis 276 | No |
| 723 | Channel | Yes |
| 823 | ABC Channel | No |

⇧⇩ for Select. & (DETERMINE) for Determine.   (LIVE) for Finish.

Example of setting auto.video-rec. CS CH

Example of program list by genre

Example of pop-up menu

Example of series-reservation picture screen

Example of the list of series-reservation

PROGRAM DATA PROCESSING METHOD AND APPARATUS

CROSS-REFERENCE TO RELATED APPLICATIONS

The present application claims priority from Japanese Application No. 2003-167156 filed May 7, 2003, the disclosure of which is hereby incorporated by reference herein.

BACKGROUND OF THE INVENTION

The present invention relates to a program data processing method and an apparatus preferably applied to a recording apparatus which records, for example, broadcast programs on a recording medium such as a hard disc.

Heretofore, a hard disc recording and reproducing apparatus which uses a hard disc as a recording medium has been in practical use for recording (video recording) television broadcasts. In the case of this hard disc recording and reproducing apparatus, it is possible to record a television broadcast signal, for example, with a recording capacity of several tens of giga-bytes for several tens of hours. With respect to the recordable hours, they are assumed to increase depending upon improvements in the recording density of the recording medium and/or upon improvements in the compression technology of the broadcast data.

In this hard disc recording and reproducing apparatus, there is an apparatus which receives electric program guide data called an EPG (Electric Program Guide) in order to perform video-recording of television programs easily. EPG data are added to broadcast data in the case of a broadcast system such as a digital satellite broadcast and are also sent by adding them in a specific time period, such as the blanking period of a video signal in a specific channel, in the case of a ground wave such as an analog broadcast. Further, there is also another system where they are signal-distributed to a user-side recording and reproducing apparatus through a transmitter such as an internet without any connection with the transmission of the broadcast data.

An effect is obtained for users such that a video-record reservation of a desired program can be performed relatively easily by receiving the EPG data transmitted in this manner, by displaying a program table of a television broadcast on a receiver screen according to the received EPG data and by performing an operation of selecting a program in the program table which is desired to be video-recorded.

Also, it is possible to make a serial program reservation at one time, such as of serial dramas which are broadcast, for example, at a predetermined time every day, by utilizing the program table according to the EPG data. Further, it is also possible to search a program by a preset keyword and to automatically reserve a program which was found by that search.

In Japanese Laid-open Pat. No. 2000-287147, there is a description of one example of a television receiver where a video-record reservation is made by utilizing such electronic program data. The reference also describes reserving continuous programs two or more times for its video-record reservation.

Television broadcasts have been provided on many channels in recent years such that a number of channels beyond 100 exists for a single broadcast service, for example, in the case of a CS (Communication Satellite) broadcast which utilizes a communication satellite. Consequently, there has been a tendency to also increase the electronic program data in proportion to the number of channels, and there is a problem that it takes a tremendous amount of time to receive all of the EPG data transmitted by one broadcast service. For example, in a certain broadcast service, program data for one week after the present for each channel are transmitted as EPG data, so that it takes a tremendous amount of time to obtain all of the EPG data for one week for all channels.

In order to receive EPG data, it is necessary to continue receiving a specific channel (promotional channel described later) in which the EPG data are obtained during a receiving period of the tuner, so that there is a problem that a function such as receiving other channels is restricted during the process of obtaining the EPG data and therefore, it is preferable if the EPG data is obtained in as short a period as possible. Also, even if all the EPG data can be received, it is necessary for the recording apparatus to save the EPG data in order to make a video-record reservation according to the received EPG data, and there is a problem that a mass-storage memory (record) medium is needed for storing the EPG data.

In addition, if, in broadcast systems formed with many channels, the video-record reservation is made with reference to only the EPG data, there is a problem that the programs which are preferable for users are not always video-recorded. More specifically, for example, if the apparatus is set such that all of the programs displayed as news in the program table according to the EPG data will be video-recorded, there are many channels which broadcast news and it is unlikely that only the news of the channels which are desired by users therein will be video-recorded.

Further, with respect to the EPG data, fundamentally the EPG data of all channels are designed to be obtainable with the exclusion of partial exceptional channels, but in the case of ground waves, it does not always happen that the channels which are receivable in good condition in an area users are living in coincide completely with the channel data obtained by the EPG data. Consequently, even if a program reservation is made according to the received EPG data, in the case that the program which was reserved for video-recording is a program of a channel whose reception is very bad in that area, a video or a sound which includes a lot of noise will be video-recorded and it is highly possible that a meaningless video recording may be performed.

Also, in the case that EPG data are transmitted by multiplexing with broadcast data in a digital broadcast system such as a CS broadcast, the system constitution is designed such that the minimum necessary amount of EPG data can be received when receiving any channel of the channels with which EPG data are multiplexed, but program information which is as detailed as possible is needed in order to make the above-mentioned program reservation, so that it is preferable to obtain EPG data by receiving a channel from which such detailed program information can be obtained. For example, in the case of a CS broadcast, a channel for guidance referred to as a promotional channel is prepared and it is the most preferable to receive EPG data from that channel.

However, there is a possibility that the channel for guidance may change owing to changes of the channel constitution. For this reason, in the case when the channel number of the channel for guidance is set to be received in a tuner (connected tuner) installed in a recording apparatus, the optimum EPG data cannot be obtained if the channel number of the channel for guidance is changed.

SUMMARY OF THE INVENTION

The present invention was made in view of the aforementioned aspect and it is a purpose thereof to achieve a process for obtaining electronic program data and for performing a video record and the like in an optimum condition.

According to the present invention, only program data relating to a predetermined preset channel out of the channels which are broadcast by a broadcast service are separated from program data which guide programs broadcast by a predetermined broadcast service, only the program data relating to the predetermined preset channel are stored, and a process is performed according to the stored program data.

According to another aspect of the present invention, a program data processing apparatus is proposed where the apparatus includes a program data obtaining mechanism operable to obtain program data which guide programs broadcast by a predetermined broadcast service, a processor operable to separate only program data relating to at least one predetermined preset channel out of the channels which are broadcast by a broadcast service from program data which are received by the program data obtaining mechanism, and a memory operable to store program data relating to the predetermined preset channel separated by the processor.

According to the present invention, it is possible to obtain program data only for restricted channels relating to a received broadcast service.

BRIEF DESCRIPTION OF THE DRAWINGS

FIG. 15 is an explanatory diagram showing a display when confirming a CS broadcast channel according to one example of the present invention;

FIG. 16 is an explanatory diagram showing a display when setting an automatic video recording channel from CS broadcast channels according to one example of the present invention;

DETAILED DESCRIPTION

One example of the present invention will be explained hereinafter with reference to the attached drawings.

Figure 1:
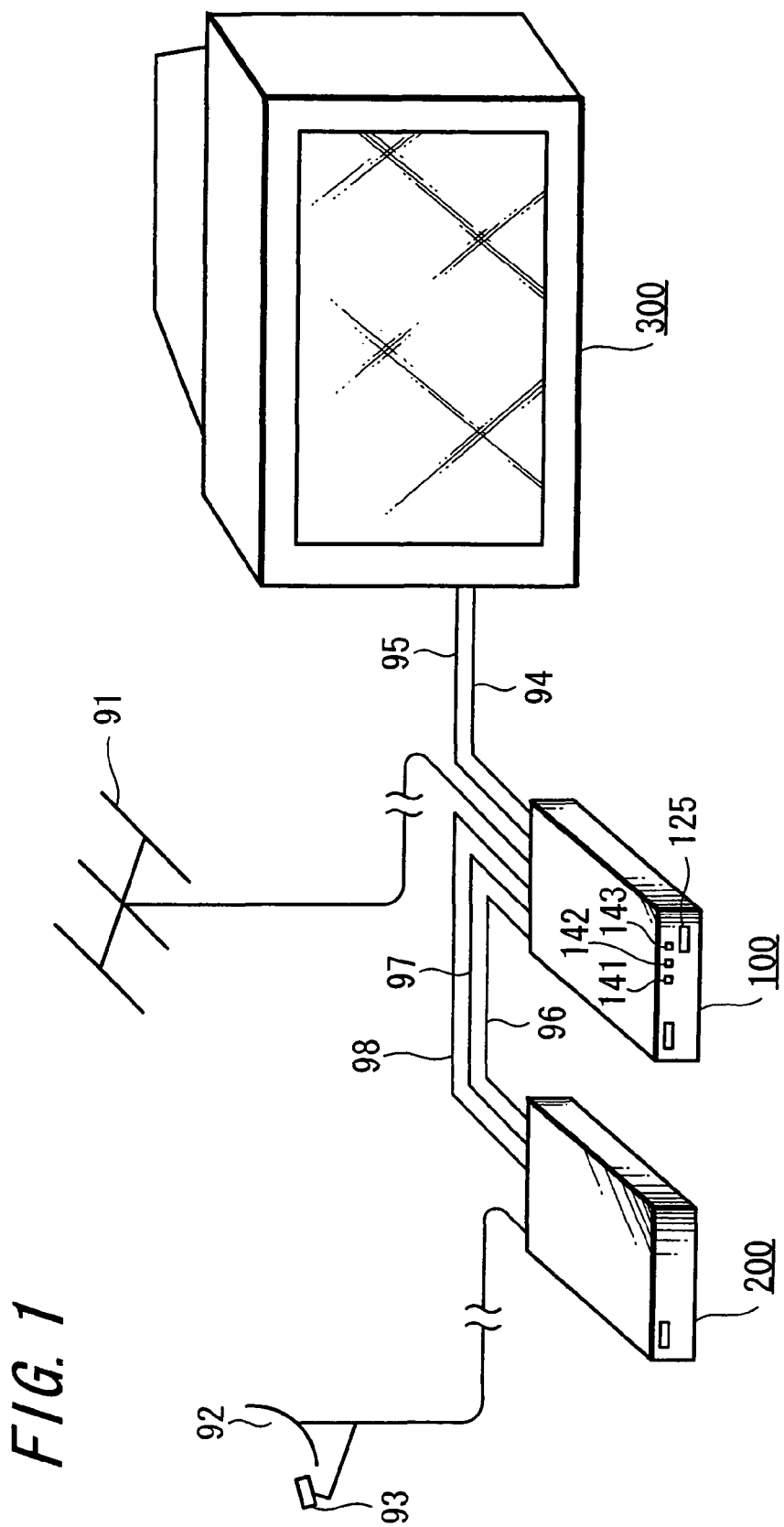
FIG. 1 is an explanatory diagram showing the constitution of a system according to one example of the present invention.

FIG. 1 is a diagram showing the constitution of a system according to the example of the present invention. In this example, a hard disc recording and reproducing apparatus 100 which video-records a television broadcast and a CS tuner apparatus 200 which receives a CS broadcast are connected to one another, and a television receiver 300 is further connected thereto. The hard disc recording and reproducing apparatus 100 is a video recording and reproducing apparatus having a hard disc which video-records and reproduces a television broadcast program. A tuner for receiving a television broadcast is installed in the hard disc recording and reproducing apparatus 100 and, for example, an antenna 91 for a ground wave is connected thereto. The CS tuner apparatus 200 is used as a tuner for receiving a CS broadcast and, for example, a parabolic antenna 92 is connected thereto such that a received wave of the CS broadcast is supplied from a converter 93 mounted on the parabolic antenna 92. The television receiver 300 has a video signal and an audio signal from the hard disc recording and reproducing apparatus 100 input thereto, and it is possible to use another display apparatus such as a monitor receiver if it is capable of displaying the video and outputting the audio. With respect to the audio signal, it can be output by supplying it to an audio output apparatus other than the display apparatus.

The CS tuner apparatus 200 is constituted so as to receive two of the CS broadcast services and transmits the video signal and the audio signal of the television broadcast (CS broadcast) received by the CS tuner apparatus 200 to the hard disc recording and reproducing apparatus 100 through cables 96 and 97, respectively. It should be noted that the two broadcast services are from different communication satellites which relay electric waves and forms of broadcast data which are also a little bit different. Additionally, the hard disc recording and reproducing apparatus 100 and the CS tuner apparatus 200 are designed to communicate bi-directionally by connecting their respective data communication ports through a cable 98 such that it is possible to transmit broadcast data and the like received by the CS tuner apparatus 200 to the hard disc recording and reproducing apparatus 100.

In the hard disc recording and reproducing apparatus 100, it is possible to record a television broadcast program of the ground wave which is received by the installed ground wave tuner onto the hard disc and to record a television broadcast program of the CS broadcast which is received by the connected CS tuner apparatus 200 onto the hard disc.

In the case of this example, the CS broadcast service received by the CS tuner apparatus 200 is a digital broadcast service which transmits a video signal and an audio signal formed by digital data. Electronic program data referred to as EPG data are added to the packets for transmitting the video and audio signals. The packets including the electronic program data are transmitted to the hard disc recording and reproducing apparatus 100 from the CS tuner apparatus 200 through the data communication port.

Also, it is possible to transmit a control signal which controls the operation of the CS tuner apparatus 200 from the side of the hard disc recording and reproducing apparatus 100 by using the connection between these data communication ports. The control signal may provide instructions, such as a power on/off instruction for the CS tuner apparatus 200, a channel change-over instruction and a changing instruction of the broadcast service to be received. However, it is not necessary to provide the changing instruction of the broadcast service to be received owing to the constitution of the connected CS tuner apparatus 200. Further, it may be possible to transmit an instruction for inquiring as to the present operating state of the CS tuner apparatus 200 (for example, whether it is in a power-on state or in a standby state) instead of operating instructions.

The video signal and the audio signal which the hard disc recording and reproducing apparatus 100 outputs are connected to the television receiver 300 through cables 94 and 95. In the television receiver 300, it is possible to display the video recorded on the hard disc which is installed in the hard disc recording and reproducing apparatus 100, and to output the audio. It should be noted that, while not shown in FIG. 1, it is possible to connect the CS tuner apparatus 200 and the television receiver 300 directly. Further, it may be possible to connect a video signal source other than the CS tuner apparatus 200 to the hard disc recording and reproducing apparatus 100 such that the video signal and the audio signal supplied from the video signal source will be recorded onto the hard disc.

Figure 2:
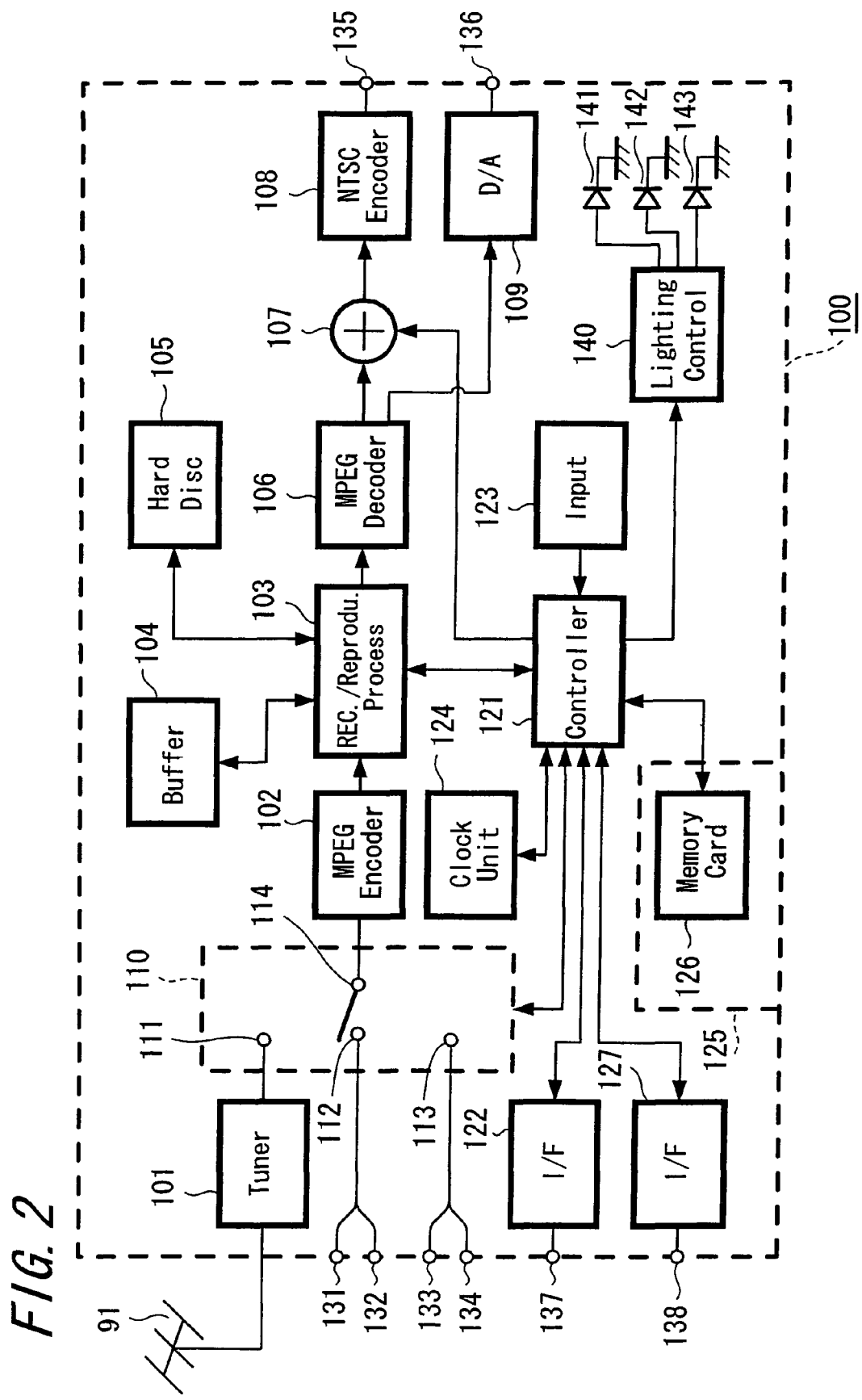
FIG. 2 is a block diagram showing the constitution of a hard disc recording and reproducing apparatus according to one example of the present invention.

Next, the constitution of the hard disc recording and reproducing apparatus 100 will be explained with reference to FIG. 2. The ground wave antenna 91 connected to the hard disc recording and reproducing apparatus 100 is connected to a ground wave tuner 101 installed in the apparatus 100, and the video signal and the audio signal of the ground wave television broadcast which are received by the tuner 101 are supplied to a terminal 111 of a change-over switch 110.

The receipt of channels by the ground wave tuner 101 is controlled by a controller 121 of the recording and reproducing apparatus 100. The ground wave received by the tuner 101 is an analog broadcast wave and it is designed such that EPG data for displaying an electronic program guide are transmitted with respect to a predetermined specific channel several times a day and at predetermined time intervals by superimposing the data into the blanking period of the video signal and the like. The EPG data are designed to be data not only for providing information on the channels on which the EPG data are superimposed, but also for providing information relating to almost all ground wave channels which are receivable in that area. Consequently, the tuner 101 operates as a program data obtaining mechanism for picking up EPG data superimposed on a channel by receiving the channel on which the EPG data are superimposed (added) during the superimposed period. The EPG data received by the tuner 101 are transmitted to the controller 121. The controller 121 of this example operates as a processor for separating only necessary program data from the supplied EPG data. The detailed process for separating only necessary program data will be described hereinafter.

The change-over switch 110 is a switch for changing over the received signal of the tuner 101 and signals obtained at input terminals 131, 132, 133 and 134 from the outside. The input terminals 131 and 132 are an input terminal of a video signal and an input terminal of an audio signal which are used as a first input portion and the signals obtained at these input terminals are supplied to a terminal 112 of the change-over switch 110. The input terminals 133 and 134 are an input terminal of a video signal and an input terminal of an audio signal which are used as a second input portion, and the signals obtained at these input terminals are supplied to a terminal 113 of the change-over switch 110. With respect to the video signals and the audio signals obtained at these terminals 111, 112 and 113, the signal selected by the controller 121 is obtained at a terminal 114. It should be noted in FIG. 2 that the transmission paths of both of the signals are shown as only one transmission line if the supply, the change over or the like of the video signal and the audio signal is performed simultaneously.

First input portion (input terminals 131 and 132) in the input portions from the outside is used as an exclusive input terminal which is supplied with the video signal and the audio signal received and output by the CS tuner apparatus 200. However, if the CS tuner is not connected, it is possible to connect another video signal source to this first input portion.

Connected to the second input portion (input terminals 133 and 134) are a video signal source for outputting a video signal and an audio signal which are desired to be recorded in the hard disc recording and reproducing apparatus 100. For example, a BS tuner, a video tape recording and reproducing apparatus or the like may be connected.

The video signal and the audio signal selected by the change-over switch 110 (the signal obtained at the terminal 114) are supplied to an MPEG (Motion Picture Experts Group) encoder 102 and are converted to digital video data and digital audio data which are compression-encoded, for example, by an MPEG2 system. The signals supplied to the encoder 102 are analog signals, so that conversion from analog signals to digital data also can be performed in the encoder 102 (or in another individual circuit).

The video data and the audio data of the MPEG2 system which are obtained in the MPEG encoder 102 are supplied to a recording and reproducing process unit 103. The recording and reproducing process unit 103 is a circuit which performs a process for recording and reproducing video data, audio data and the like to and from a hard disc 105. A buffer memory 104 is connected to the recording and reproducing process unit 103 and is designed such that data are temporarily stored in the buffer memory 104 and at the same time data is recorded thereto and reproduced therefrom. It should be noted that the hard disc 105 also may be used as a memory (recording mechanism) of electronic program data. More specifically, the electronic program data processed in the controller 121 may be recorded to and reproduced from the hard disc 105 under the control of the controller 121. However, it is possible to use a memory (not shown) connected to the controller 121 as a memory for the electronic program data without using the hard disc 105. The hard disc 105 is constituted such that a head records thereto and reproduces therefrom while a spindle motor is rotated at a high speed and it is possible to record a television broadcast signal, for example, having a recording capacity of several tens of giga bytes for several tens of hours.

The video data and the audio data which were reproduced from the hard disc 105 and processed in the recording and reproducing process unit 103 are supplied to an MPEG decoder 106 where they are decoded from the MPEG2 system. The decoded video data are supplied to an NTSC encoder 108 through a mixer 107 and then supplied to an output terminal 135 as an analog video signal of the NTSC system. The decoded audio data are converted to an analog audio signal in a digital/analog converter 109 and the analog audio signal is supplied to an output terminal 136. Output terminals 135 and 136 correspond to the terminals connected to the television receiver by means of cables 94 and 95 in FIG. 1.

The hard disc recording and reproducing apparatus 100 of this example also is provided with a data communication port 137 for communicating with the CS tuner apparatus 200. It is constituted such that data which are necessary for an interface 122 are separated at this data communication port 137 from the data transmitted from the CS tuner apparatus 200 and are transmitted to the controller 121. Such data may include, for example, electronic program data transmitted from the CS tuner apparatus 200 to the recording and reproducing apparatus 100. Further, data (various instructions, etc. mentioned in the explanation of FIG. 1) which are desired to be transmitted from the controller 121 to the CS tuner apparatus 200 are output from the data communication port 137 through the interface 122.

Instructions for operating the hard disc recording and reproducing apparatus 100 are supplied from an input unit 123 composed of operating keys, a remote control signal receiving portion (light receiving portion) and the like. If, for example, an operating instruction reaches the input unit 123 from a remote control device (not shown) by means of an infrared signal, the received instruction is transmitted to the controller 121. Instructions by the remote control device, the key operations and the like include, for example, other than instructions which directly instruct video recording, reproducing, channel changing over and the like, an operating instruction of a so-called GUI (Graphical User Interface) where a multi-functional operation is performed by operating a cursor key, a decision key and the like with reference to the display of the receiver 300 connected to the hard disc recording and reproducing apparatus 100.

When the process of forming a display screen for the GUI operation is performed, the controller 121 transmits the screen data to the mixer 107 so as to mix with the video data output from the MPEG decoder 106, and the video signal output from the output terminal 135 is a video signal which can display a corresponding screen.

When it is necessary to form various displays other than the screen for the GUI operation by using the hard disc recording and reproducing apparatus 100, the controller 121 similarly forms their display screen data and transmits them to the mixer 107. Examples of the screens displayed by these processes will be described hereinafter.

Also, a clock unit 124 is connected to the controller 121, and the output of the clock unit 124 with respect to the present time (year/month/day, time/minute/second) is determined in the controller 121 when needed. The date and hour counted by the clock unit 124 are determined in the controller 121 and the execution of a reserved video-record and the like will be carried out therein. With respect to the time counted by the clock unit 124, it is possible to carry out the setting and/or correction thereof by user operations and it is also possible to correct the time automatically according to the signal received by the tuner 101 (or by the CS tuner apparatus 200 connected to the hard disc recording and reproducing apparatus 100).

Further, the hard disc recording and reproducing apparatus 100 of this example is equipped with three light emitting diodes 141, 142, 143 as lighting devices at the front panel portion of the apparatus. The lighting of these three light emitting diodes 141 to 143 is controlled individually by the lighting control unit 140 according to the control of the controller 121. The three light emitting diodes 141 to 143 are designed such that, for example, the colors of the emitting lights thereof are different one another. In the case of this example, the light emission of the three light emitting diodes 141 to 143 is used to notify when a new video record (specifically, a series reservation) is made.

Additionally, the hard disc recording and reproducing apparatus 100 of this example is provided with a card slot 125 in which a memory card 126 may be removably inserted. Various processes can be performed through the controller 121 by reading-out data stored in the memory card 126. If, for example, still picture data or moving picture data are stored in the memory card 126, the video data may be read out by the controller 121 and transmitted to the mixer 107, and may be displayed on the receiver 300 connected to the recording and reproducing apparatus 100. Alternatively, it is possible to record the data read out from the memory card 126 to the hard disc 105 and the like.

Further, the hard disc recording and reproducing apparatus 100 of this example is provided with a port 138 to be connected to the internet. The exchange of data through a communication unit connected by means of the port 138 can be carried out by the controller 121 through an interface 127.

The port 138 is designed such that it can be connected, for example, with a router or a modem for the internet connection through a predetermined cable. It is also possible to obtain electronic program data by accessing the server of a predetermined address through the port 138.

When electronic program data are obtained through various processes, the controller 121 saves the electronic program data in a partial area of the hard disc 105 such that the display of an electronic program guide, a video-record reservation process or the like is performed by utilizing the saved data. Three kinds of electronic program data may be obtained by the controller 121, namely, electronic program data received by the built-in tuner 101, electronic program data obtained from the CS tuner apparatus 200 connected through the port 137, and electronic program data obtained through the internet. It is determined beforehand which electronic program data will be used.

It should be noted that a nonvolatile memory (not shown) is connected to the controller 121 and various setting matters are to be stored therein. In addition, information of video-record reservations is stored in the nonvolatile memory. However, it is possible to use a partial recording area of the hard disc 105 instead without providing a nonvolatile memory.

Figure 3:
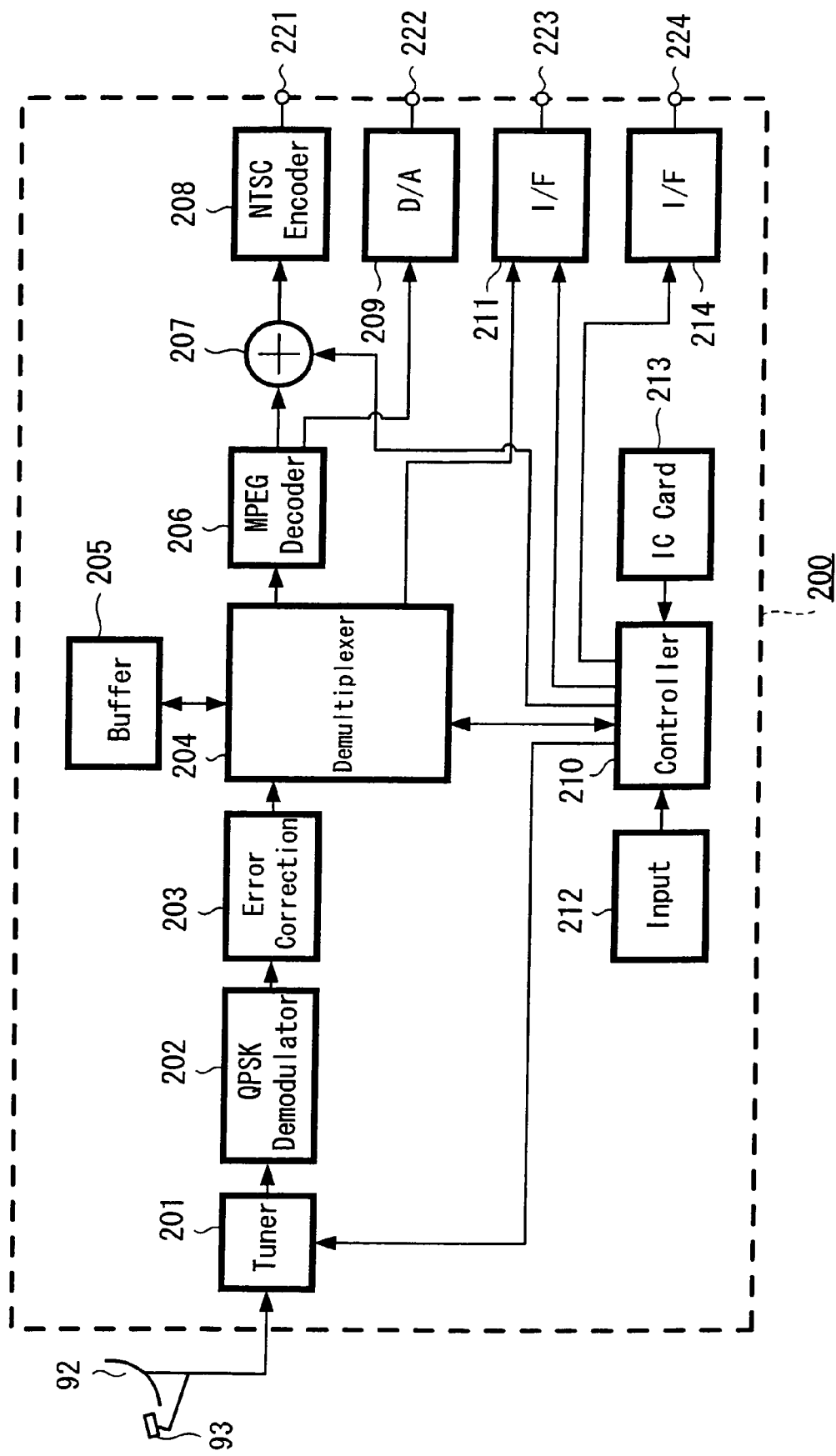
FIG. 3 is a block diagram showing the constitution of a tuner apparatus according to one example of the present invention.

Next, the constitution of the CS tuner apparatus 200 connected to the hard disc recording and reproducing apparatus 100 according to this example will be explained with reference to FIG. 3.

The parabolic antenna 92 which receives a satellite broadcasting wave is connected to the CS tuner apparatus 200, and packets including received channel data are receiving-processed in the tuner 201 with respect to the signal which is supplied from the converter 93 of the parabolic antenna 92. The selection of the received packets is controlled by a controller 210. The packets received by the tuner 201 are supplied to a QPSK (Quadrature Phase Shift Keying) demodulator unit 202 and data of the received packets are QPSK-processed. The demodulated data are supplied to an error correction unit 203 and an error correction process is performed.

The error corrected received data are supplied to a demultiplexer 204 and video data, audio data and other data of the received channel are separated from the received packets. The other data includes, for example, electronic program data. This separation process is controlled by the controller 210 and it is designed such that data necessary for the data processing is temporarily stored in a buffer memory 205 connected to the demultiplexer 204.

The video data and audio data separated in the demultiplexer 204 are supplied to an MPEG decoder 206 and the video data and audio data which are encoded by the MPEG2 system are decoded therein. The video data decoded in the MPEG decoder 206 are supplied to an NTSC encoder 208 through a mixer 207 and then to an output terminal 221 as an analog video signal of the NTSC system. The decoded audio data are converted to an analog audio signal in a digital/analog converter 209 and the analog audio signal is supplied to an output terminal 222. These output terminals 221 and 222 correspond to the terminals connected to the hard disc recording and reproducing apparatus 100 through cables 96 and 97 in FIG. 1. The electronic program data separated in the demultiplexer 204 are transmitted to the controller 210.

The video signal output from the terminal 221 may include various guide displays which are formed in the controller 210. More specifically, video data for a guide display formed in the controller 210 may be supplied to the mixer 207 and superimposed on the video data output from the MPEG decoder 206, and the combined video data may be supplied to the NTSC encoder 208. The screen data for the guide display may include, for example, video data for displaying an electronic program guide according to the electronic program data added to the received channel signal.

Also, the CS tuner apparatus 200 of this example is provided with a data communication port 223 for communicating with the hard disc recording and reproducing apparatus 100. The data communication port 223 is connected to the data communication port 137 of the hard disc recording and reproducing apparatus 100 by means of an exclusive cable (cable 98 shown in FIG. 1). The broadcast data to be transmitted by using the data communication port 223 are transmitted from the demultiplexer 204 to an interface 211, and are output from the interface 211 in the data form to be output from the port 223. Packets which are included in the received broadcast data (more specifically, data including video data, audio data, EPG data, etc.) are transmitted from the port 223 to the hard disc recording and reproducing apparatus 100. Only EPG data are separated from the transmitted packet data in the hard disc recording and reproducing apparatus 100.

When the interface 211 receives data (various instructions, etc.) transmitted from the hard disc recording and reproducing apparatus 100 through the data communication port 223, these data are transmitted to the controller 210. Data may be transmitted to the hard disc recording and reproducing apparatus 100 from the controller 210 through the interface 211.

Instructions for operating the CS tuner apparatus 200 are supplied from an input portion 212 composed of operating keys and a remote control signal receiving portion (light receiving portion). If, for example, an operating instruction reaches the input portion 212 from a remote control device (not shown) by means of an infrared signal, the received instruction is transmitted to the controller 210.

An IC card 213 which retains data relating to reception contracts, such as user registration information and viewing and listening records, may be loaded in the CS tuner apparatus 200, and the controller 210 will receive pay channels and the like according to the information stored in the IC card 213.

Further, the CS tuner apparatus 200 is provided with a connection terminal 224 of a telephone line, and it is possible to transmit data to the telephone line connected to the terminal 224 from the controller 210 through an interface 214. The data transmitted through the telephone line may include data relating to reception contracts, such as viewing and listening records of pay channels.

It should be noted as already explained that it is possible for the CS tuner apparatus 200 of this example to receive two broadcast services (service A and service B) and the satellites for reception may be different for the respective broadcast services. In a case in which the situation is changed from a state of receiving a channel of a service A to a state of receiving a channel of a service B (or vice versa), there are two types of tuners, that is, a type of tuner in which a channel changing over operation must be performed after a satellite changing over operation, and a type of tuner in which the broadcast service is changed over automatically by the channel changing over operation. Many relatively old types of tuners require a satellite changing over operation.

Next, a process will be explained for performing recording (video recording) and reproduction in the hard disc recording and reproducing apparatus 100 where the hard disc recording and reproducing apparatus 100 and the CS tuner apparatus 200 having the constitutions described above are connected as shown in FIG. 1. The process will be explained with reference to the flowcharts of FIG. 4 to FIG. 8 and the display examples shown in FIG. 9 and the subsequent figures. It is assumed that user operations for performing these processes are executed, for example, by a remote control device (not shown) attached to the hard disc recording and reproducing apparatus 100. Specifically, the input of each item is performed by the operation of a cursor key, a determination key or the like of a remote control device such that the video (video for GUI operation) output from the output terminal 135 of the hard disc recording and reproducing apparatus 100 is displayed on the television receiver 300. The display examples shown in FIG. 9 and the subsequent figures are examples of display screens for this GUI operation.

As to the video recording of the broadcast program in the hard disc recording and reproducing apparatus 100 according to this example, as already explained, there are a video recording of a program of a ground wave television broadcast received by the tuner 101 installed in the recording and reproducing apparatus 100 and a video recording of a program of a CS broadcast wave television broadcast received by the CS tuner apparatus 200. In order to perform the video recording of these broadcast programs, firstly a setup is necessary in the hard disc recording and reproducing apparatus 100. The setup process is executed under the control of the controller 121 and with respect to the set up matters, they are stored (recorded) in a nonvolatile memory (not shown), a hard disc or the like connected to the controller 121.

Figure 4:
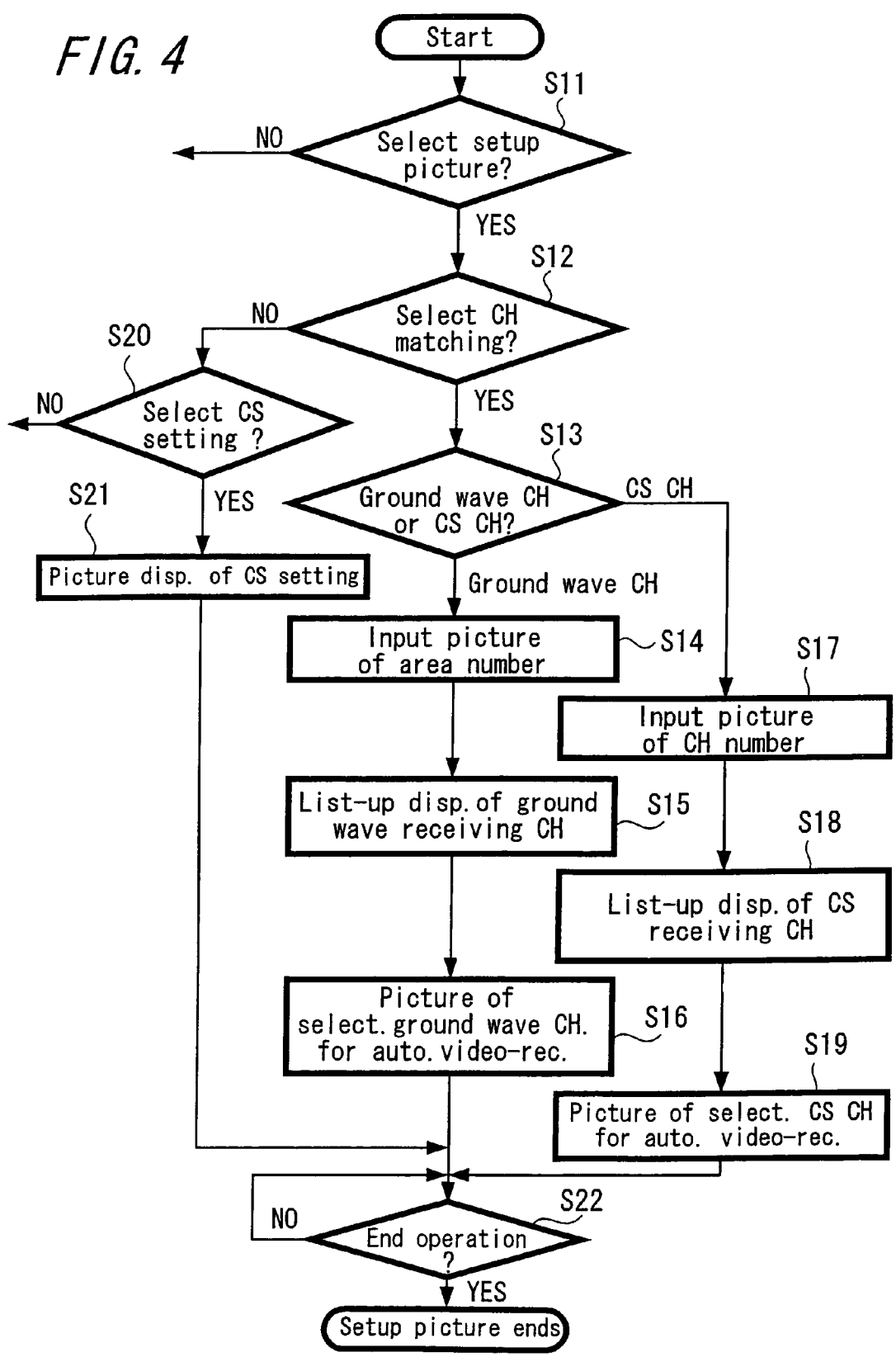
FIG. 4 is a flowchart showing a setup process according to one example of the present invention.

FIG. 4 is a flowchart showing one example of the setup process. First, the controller 121 of the hard disc recording and reproducing apparatus 100 determines whether the user operation is a selection for displaying a setup screen (step S11). At this time, if the display of the setup screen is not selected, the flow shifts to another process. If the display of the setup screen is selected, the setup screen is displayed. In addition, in the case of an initial setting, it is possible to make a setup screen be displayed automatically in cooperation with the application of power to the hard disc recording and reproducing apparatus 100.

Figure 9:
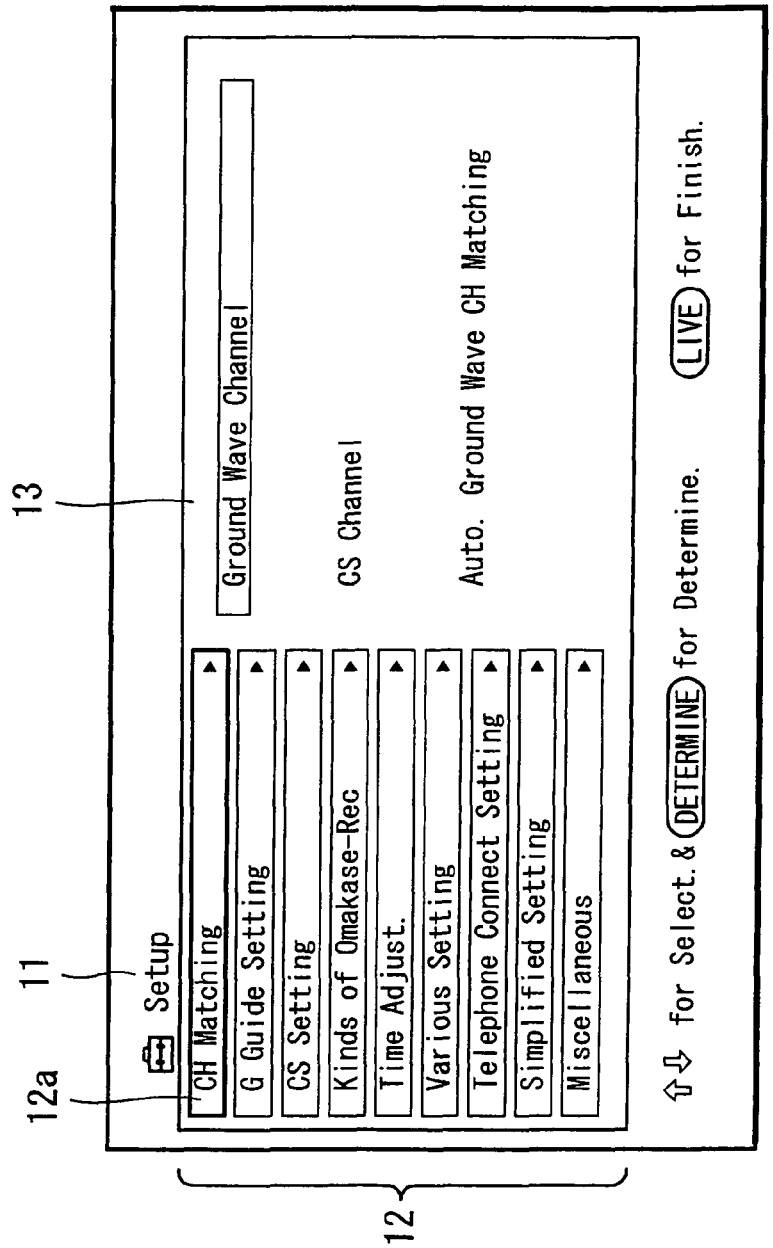
FIG. 9 is an explanatory diagram showing the display of a setup menu according to one example of the present invention.

FIG. 9 shows a first display example of this setup screen and a menu for performing a setup is displayed. More specifically, as shown in FIG. 9, there is a display 11 designating "setup" at the top of the screen and a display 12 of a setup menu on the left side of the screen. Here, a state is shown where a display 12a of channel matching has been selected from the menu and a display 13 of items for performing the channel matching is made on the right side of the screen.

When the setup screen is displayed, it is determined whether channel matching has been selected from the setup menu displayed on the screen (step S12). If channel matching has been selected, either channel matching to the ground wave or channel matching to the CS channel is further selected (step S13).

If channel matching has been selected as shown in the display 12a of FIG. 9, three items of <ground wave channel>, <CS channel> and <automatic channel matching to ground weave> are displayed as the display 13 of items for performing the channel matching.

Figure 11:
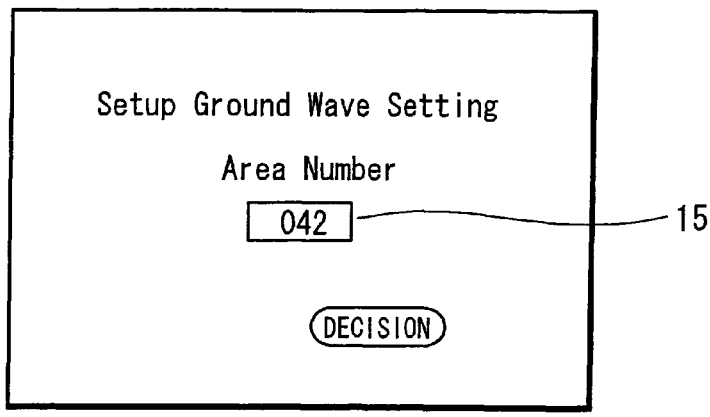
FIG. 11 is an explanatory diagram showing a display when setting a ground wave channel according to one example of the present invention.

Here, if the channel setting of the ground wave is selected, a screen is displayed in which a code number (area number) allotted to each area which is installed with this system is to be input by a user operation and the area number is input on that screen (step S14). FIG. 11 is a diagram showing an example of an input screen for the area number having a display area 15 for inputting the area number.

If an area number is input into the display area shown in FIG. 11, a list of ground wave television broadcast channels which can be received in that area is displayed on the screen (step S15). It should be noted that the data of channel numbers and broadcasting station names of receivable channels for each area number are stored beforehand in a memory or the like connected to the controller 121 of the hard disc recording and reproducing apparatus 100.

Figure 12:
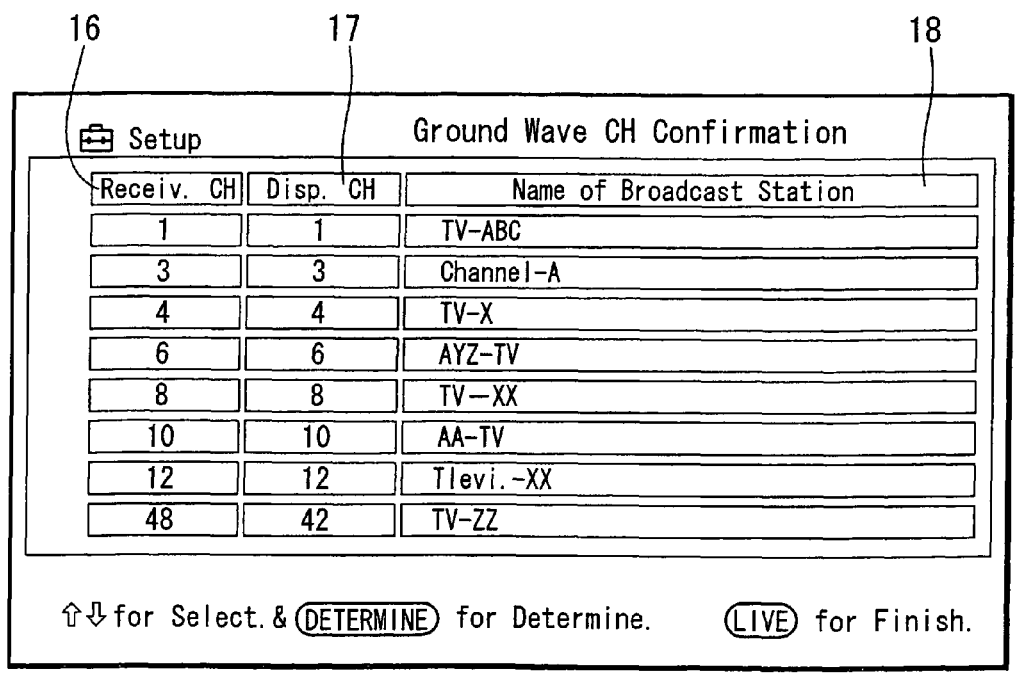
FIG. 12 is an explanatory diagram showing a display when confirming a ground wave channel according to one example of the present invention.

FIG. 12 is one example of a confirmation screen of the receivable channels which is displayed according to the input of the area number. Here, a list 16 of the receiving channel numbers, a list 17 of displayed channel numbers and a list 18 of broadcasting station names are displayed. It is possible to change the channel number which is actually displayed on the screen from the receiving channel number by changing the channel number in the list 17. As it is possible to change in this manner, it is possible to make the channel numbers displayed for so-called satellite stations coincide with the channel numbers which users remember. It should be noted that in the case of the ground wave, EPG data are only transmitted by specific channels which are predetermined for each area, and if a channel setting is performed by inputting the area number, the receiving channel number for obtaining the EPG data is automatically set to the corresponding channel number according to the data prepared beforehand.

As shown in FIG. 12, users confirm the list of the receiving channels displayed and, if satisfactory, the flow shifts to a next process. If users confirm the list of the receiving channels and want to add a channel as a receivable channel or to cancel a channel, corresponding user operations are performed. It should be noted that it is not shown in the flowchart of FIG. 4, but it is possible to select the registration channels station by station according to user operations other than the input of the area number which is shown in step S14. In the registration of channels, it is also necessary to register the channel for obtaining EPG data of the ground wave by a user operation.

The receiving channel selected by the processes until this point becomes the ground wave channel which can be received by the tuner 201 under the control of the controller 121. More specifically, if, for example, a channel up key or a channel down key of a remote control device is operated, the receiving channels will be changed in the order of channel numbers and the like among the selected receiving channels.

When the channel setting for receiving the ground wave is finished, a screen is displayed for selecting a channel from among the receiving channels to be registered as a channel for which an automatic video-recording is performed (step S16). The automatic video recording here is a process by which the controller 121 determines the electronic program data of the broadcast channel so as to search out a program which coincides with the predetermined condition, and performs a video-record reservation of the searched out program automatically. The predetermined condition may include, for example, a process for reserving the video-recording of the program automatically and for video-recording the program onto the hard disc automatically when a specific keyword is included in the program name or in a program guiding sentence shown by the electronic program data.

Figure 13:
FIG. 13 is an explanatory diagram showing a display when setting an automatic video recording channel from ground wave channels according to one example of the present invention.

FIG. 13 is a diagram showing an example of a setting screen of an automatic video-recording channel of the ground wave. According to this example, a list 19 of display channel numbers, a list 20 of broadcasting station names and a list 21 of the automatic video record setting for each channel are displayed. The setting can be done for each channel independently by selecting the channel and indicating in the list 21 whether the automatic video recording will be done for that channel.

With respect to a channel selected as a channel for carrying out automatic video recording according to the display in step S16, the controller 121 carries out the video-record reservation of the program automatically when a program which conforms to a definite condition is found according to an input of a keyword and the like. Also, with respect to a channel selected as a channel for not carrying out automatic video recording according to the display in step S16, such an automatic video recording process is not performed. With respect to a channel which is not selected as an automatic video recording channel, it is possible to video-record by a user operation (such a video recording is referred to herein as a manual video recording to distinguish it from an automatic video recording).

Returning to step S13, if a channel setting of a CS channel is selected, the controller 121 displays an input screen of the receiving channel numbers and receiving channel numbers are input on that input screen by a user operation (step S17). According to the hard disc recording and reproducing apparatus 100 of this example, it is possible to set a maximum of 20 channels whose reception can be directed from this apparatus to the CS tuner apparatus 200. It is possible to choose these 20 channels at random from the two broadcast services which can be received by the CS tuner apparatus 200.

Figure 14:
FIG. 14 is an explanatory diagram showing a display when setting a CS broadcast channel according to one example of the present invention.

FIG. 14 is an example of an input screen relating to the channel numbers of the CS channels. According to this example, areas 22 into which channel numbers can be input will be displayed sequentially one by one and the number of areas 22 is increased whenever the input of one channel number is finished so as to input a maximum of twenty channel numbers. According to the example of FIG. 14, each channel number is shown as a triple-digit number.

When the input of channel numbers is carried out and the decision operation is performed in step S17, a list of the broadcasting station names of the input channel numbers is displayed (step S18). The correspondence of these channel numbers and the broadcasting station names may be stored beforehand in the hard disc recording and reproducing apparatus 100, but it is also possible to obtain such correspondence from the data received by the connected CS tuner apparatus 200. The receiving channels of the CS broadcast displayed by the list of step S18 are channels which can be reserved for, video recording according to the electronic program data in the hard disc recording and reproducing apparatus 100 of this example.

FIG. 15 is a sample display of listed broadcasting station names of the CS channel numbers. Here, a list 24 of receiving channel numbers, a list 25 of corresponding broadcasting station names and a list 26 of broadcast services are displayed. As already explained, there are two kinds of services (referred to as service A and service B herein) which can be received by the CS tuner apparatus 200 according to this example, and the communication satellites which transmit (relay) electric waves are different from one broadcast service to the other.

When users confirm the list of the receiving channels of the CS broadcast in step S18, a screen is displayed for selecting a channel from the CS broadcast receiving channels to be registered as a channel for which an automatic video recording is performed (step S19). The automatic video recording here is the same as the automatic video recording of the ground wave; it is a process by which the controller 121 determines the electronic program data of the broadcast channel so as to search out a program which coincides with the predetermined condition, and performs a video-record reservation of the searched out program automatically.

FIG. 16 is a sample display of a channel setting for an automatic video recording relating to CS channels. A list 27 of receiving channel numbers, a list 28 of corresponding broadcasting station names and a list 29 of the automatic video recording setting for each channel are displayed. The setting can be done for each channel independently by selecting the channel and indicating in the list 29 whether the automatic video recording will be done for that channel.

With respect to a channel selected as a channel for carrying out automatic video recording according to the display in step S19, the controller 121 carries out the video-record reservation of the program automatically when a program which conforms to a definite condition is found according to an input of a keyword and the like. Also, with respect to a channel selected as a channel for not carrying out automatic video recording according to the display in step S19, such an automatic video recording process is not performed. With respect to a channel which is not selected as an automatic video recording channel, it is possible to select a program to be video-recorded by a manual video recording process by a user operation while the electronic program guide is displayed.

Returning to step S12, if it is determined that an item other than channel matching has been selected from the setup screen, it is determined whether a setting (but other than a channel setting) has been selected with reference to the reception of the CS broadcast (step S20), and in the case of a reception setting of the CS broadcast, a screen for inputting corresponding items is displayed (step S21).

Figure 10:
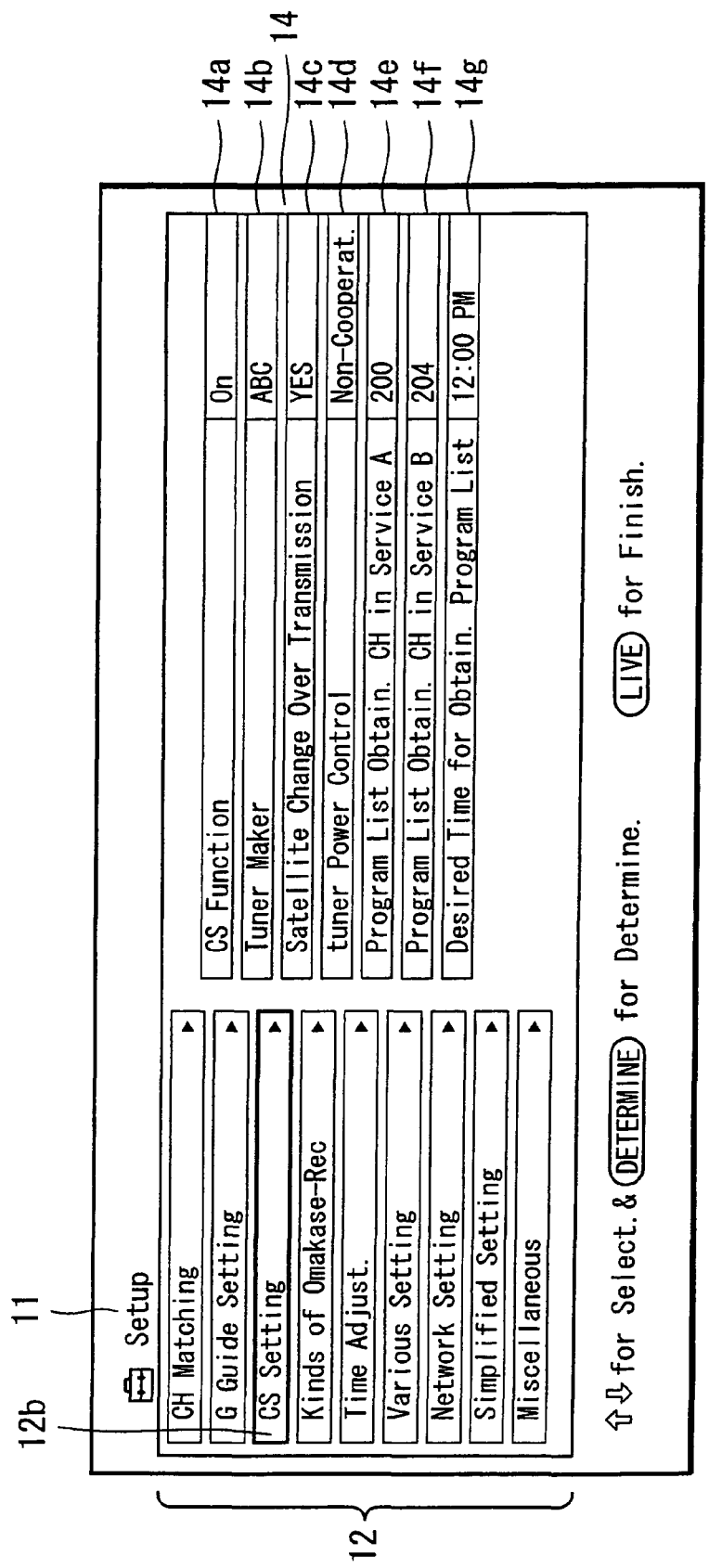
FIG. 10 is an explanatory diagram showing another display of a setup menu according to one example of the present invention.

FIG. 10 is a sample display of a setup menu relating to a reception setting of the CS broadcast. In this example, a case is shown in which a CS setting display 12b is selected in the menu display 12 and a detailed list 14 relating to the CS setting is displayed on the right side of the screen. To explain the detailed list 14 sequentially, there are displayed an on/off display 14a of a CS function, a display 14b of the manufacturer's name of the connected CS tuner apparatus 200, an on/off display 14c of the satellite change-over transmission, a display 14d indicating cooperation or non-cooperation with the tuner power control, a display 14e of an EPG data obtaining channel number for displaying an electronic program guide for service A, a display 14f of an EPG data obtaining channel number for displaying an electronic program guide for service B and a display 14g of the desired time for obtaining the EPG data.

It is possible to make a preferred setting state by selecting each display item and performing an operation to change when the reception setting screen of the CS broadcast is displayed, as shown in FIG. 10. To explain each of the concrete items, it is possible to control the connected CS tuner by making the CS function "ON" and to not control the CS tuner by making the CS function "OFF". It is possible to control the operation of the CS tuner correctly by setting the name of the manufacturer of the connected CS tuner apparatus 200 correctly with respect to the display 14b.

If a channel change over is carried out to a channel of a different CS broadcast service by setting "on" with respect to the on/off display 14c of the satellite change-over transmission, a satellite changing instruction is transmitted to the CS tuner apparatus 200 and thereafter an instruction of a channel number is to be transmitted. If it is set as "OFF", the satellite changing instruction is not transmitted even in the case that a channel change over to a channel of a different CS broadcast service is performed and an instruction of a channel number is to be transmitted directly. It should be noted that in a case when a satellite changing instruction is output, it is necessary to take an interval of several seconds after the satellite changing instruction is output until an instruction of a channel number is transmitted.

In a case when "cooperation" is set relating to the display 14d of cooperation or non-cooperation with the tuner power control, the power supply of the CS tuner apparatus 200 is placed in an on state only when it is necessary for the hard disc recording and reproducing apparatus 100 to operate the CS tuner apparatus 200, and it is placed in an off state (alternatively, a standby state) in other cases. In a case when "non-cooperation" is set, the power supply of the CS tuner is not controlled by the hard disc recording and reproducing apparatus 100. Consequently, if a video-record reservation of the CS channel and the like are performed after setting "non-cooperation", it is necessary to place the power supply of the CS tuner apparatus 200 in an always on state.

The display 14e of an EPG data obtaining channel number for displaying an electronic program guide for service A, and the display 14f of an EPG data obtaining channel number for displaying an electronic program guide for service B, are preset to channel numbers which can obtain electronic program data in the best condition for the respective services. In the case of this example, the channel numbers of promotional channels which are prepared for the respective services are set at the time of shipment of the hard disc recording and reproducing apparatus 100. However, it is possible for the channel numbers of the promotional channels to be changed and in such a case, user inputs for changing the channel numbers are displayed in the display 14e or the display 14f.

The display 14g displays the desired starting time for obtaining the EPG data of the CS channel. It is fundamentally possible at any time to obtain the EPG data of the CS channel if it is within the time when the broadcast service is carried on, but it is necessarily a relatively long time to obtain the EPG data. It is also necessary to make the obtaining time of the EPG data not overlap with the time reserved for the video recording as much as possible, so that it is fundamentally preferable to set the obtaining time for when there is little possibility that programs desired by the users are being transmitted.

It should be noted that, though an example of a screen therefor is not shown, the setting (change) can be performed by displaying the obtaining time on a setting screen of the ground wave broadcast also with respect to the EPG data of the ground wave. However, the ground wave EPG data are made to be transmitted only several times a day at time points determined beforehand in the present circumstances, so that they can be selected from only the several times of the transmission time. The time zone which can be set as the EPG data of the CS channel is avoided from overlapping with the time zone for obtaining the EPG data of the ground wave.

Figure 5:
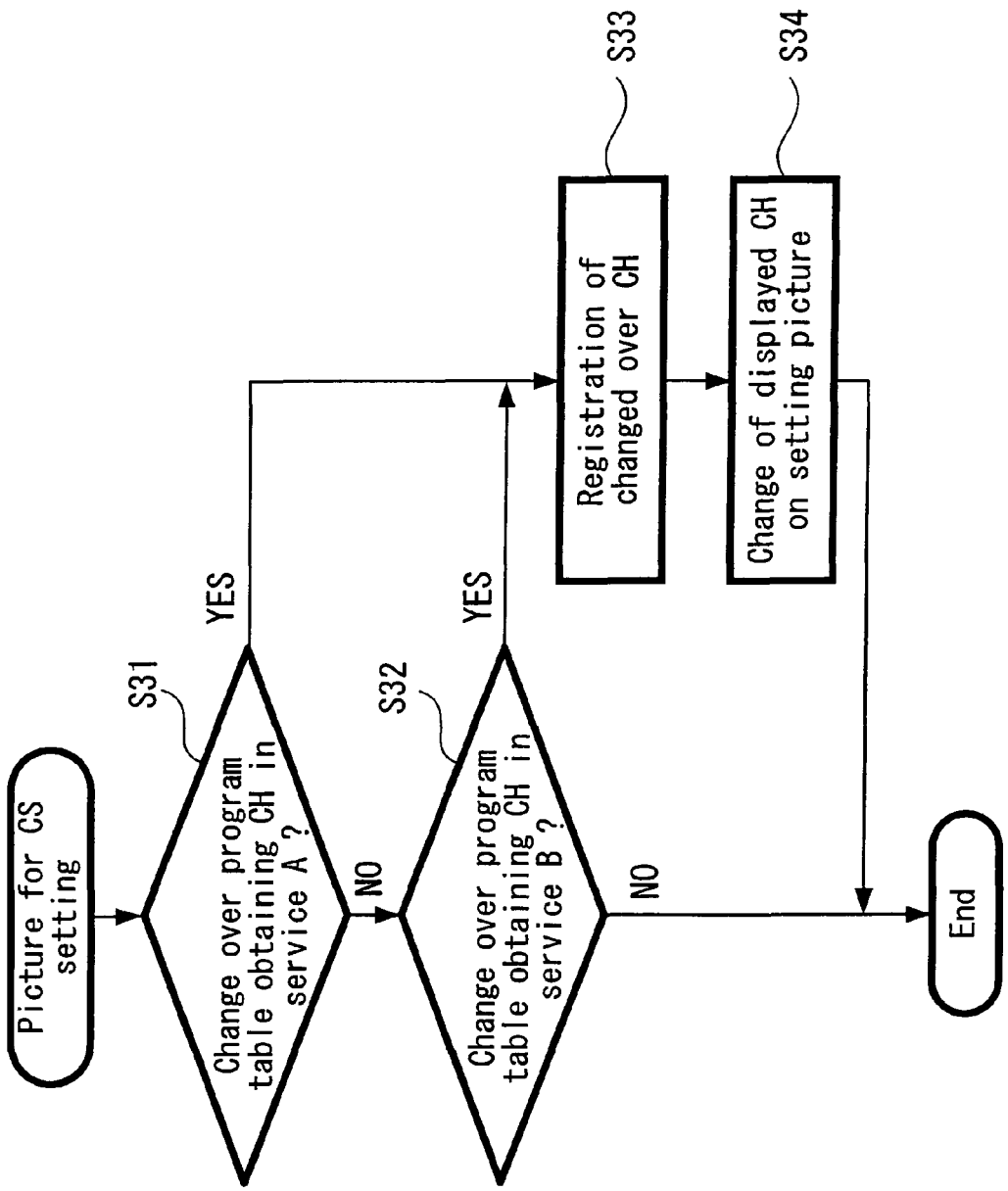
FIG. 5 is a flowchart showing a channel change process for obtaining a program table according to one example of the present invention.

A processing example in the controller 121 in a case when the displays 14e and 14f of channel numbers for obtaining the EPG data shown in the display example of FIG. 10 are changed will be explained with reference to the flowchart of FIG. 5. First, it is determined whether there is an input for changing the channel for obtaining the EPG data for the service A such that the setup menu shown in FIG. 10 is displayed (step S31), and if a corresponding input does not exist, it is determined whether there is an input for changing the channel for obtaining the EPG data in the service B (step S32). If there is an input for changing the channel for obtaining the EPG data of either one of the services, the changed channel number is registered as a channel to be received when obtaining the EPG data in the corresponding service, and is stored in the nonvolatile memory or the hard disc (step S33). The channel number displayed as the display 14e or 14f will be changed to that registered channel number (step S34).

In this manner, it can be easily dealt with by means of a user operation even if the channel numbers and the like of the promotional channels are changed on the side of the broadcast service according to the constitution where the channel numbers for obtaining the data of the electronic program guide can be changed.

Figure 6:
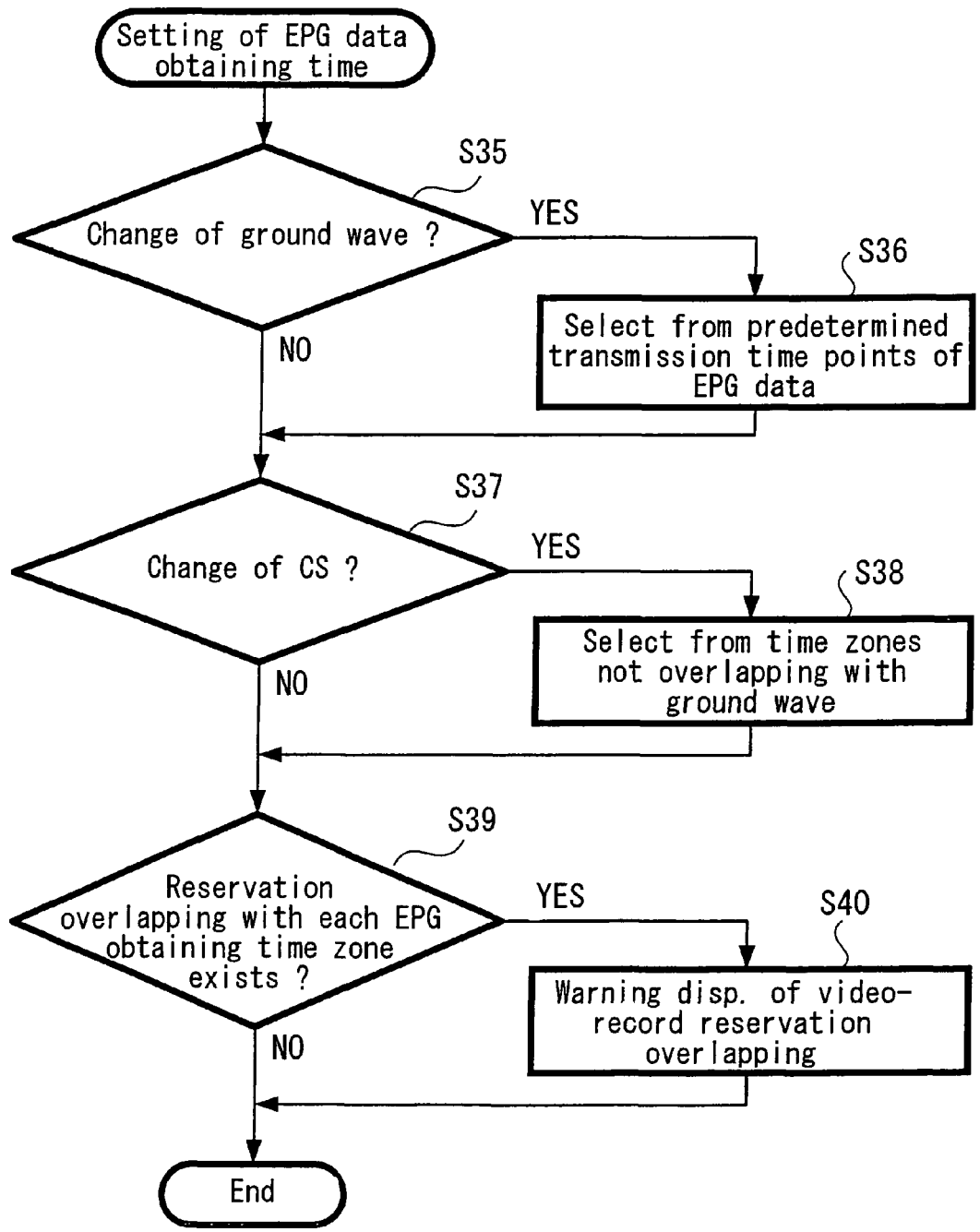
FIG. 6 is a flowchart showing a time set process for obtaining EPG data according to one example of the present invention.

Next, a processing example in the controller 121 when performing the time setting for obtaining the EPG data which display the electronic program guide will be explained with reference to the flowchart shown in FIG. 6. First, it is determined whether an operation to change the time for obtaining the EPG data is an operation to change the time for obtaining the EPG data of the ground wave (step S35). When it is an operation to change the time for obtaining the EPG data of the ground wave, only the multiple time points at which EPG data are determined beforehand to be transmitted will be displayed as candidates so as to select any one of the candidate time points (step S36). For example, only the starting time points for obtaining the EPG data may be displayed on the setting screen, but actually a relatively long time is needed to obtain the EPG data. It is next determined whether the operation is one to change the obtaining time of the EPG data of the CS channel (step S37) In a case in which the obtaining time of the EPG data of the CS channel is to be changed, time points which become a plurality of candidates are displayed from time zones which do not overlap with the time zones for obtaining the EPG data of the ground wave, and any one of the candidate time points can be selected (step S38).

After the setting of the obtaining times of the EPG data has been performed until this stage, it is determined whether there is a video-recording reservation which has a time overlapping with the newly set obtaining times (step S39) If there is a video-recording reservation overlapping with an obtaining time, a warning display indicating that the video-recording reservation is overlapping is superimposed on the setup screen at that time (step S40). It is possible to carry out the warning display according to an acceptance of users. If it is authorized, the video-recording reservation will be cancelled. If it is not authorized, the flow returns to step S35. It should be noted that the video recording reservation also will be cancelled if the authorization is refused to be accepted.

Users who confirm that the video-recording reservation overlaps with the obtaining time zone of the EPG data by means of the warning display can avoid the inconvenience of not operating correctly by changing the obtaining time of the EPG data or by changing the time for the video-recording reservation.

Next, a process will be explained for actually obtaining the EPG data after the setup has been completed in the hard disc recording and reproducing apparatus 100. First, a process for obtaining the EPG data of the ground wave under the control of the controller 121 will be explained with reference to the flowchart of FIG. 7.

The controller 121 first determines whether a time has arrived for obtaining the EPG data of the ground wave by means of the time counted by the clock unit 124 (step S41). If such a time has not yet arrived, the controller 121 waits until such a time is reached. If it is determined that a time for obtaining the EPG data of the ground wave has been reached, the channel which was registered beforehand for obtaining the EPG data of the ground wave is received by the tuner 101 (step S42). The EPG data is then obtained through the reception of that channel (step S43). After the obtaining process has started, it is determined whether a complete unit of EPG data has been obtained (step S44), and the obtaining process continues until the complete unit of EPG data has been obtained. According to this example, data of the electronic program guide from the current day until one-week later are obtained for all channels broadcasted in that area (but excluding partial channels without EPG data).

Then, if the complete unit of EPG data has been obtained, the obtained EPG data are saved in the hard disc (step S45). It should be noted that it is possible to save the obtained data in the hard disc in sequential steps as the data is obtained.

The EPG data saved in the hard disc is then organized into a data structure which can be utilized easily in the recording and reproducing apparatus 100 (step S46), and the data obtaining process of the ground wave is ended.

Figure 7:
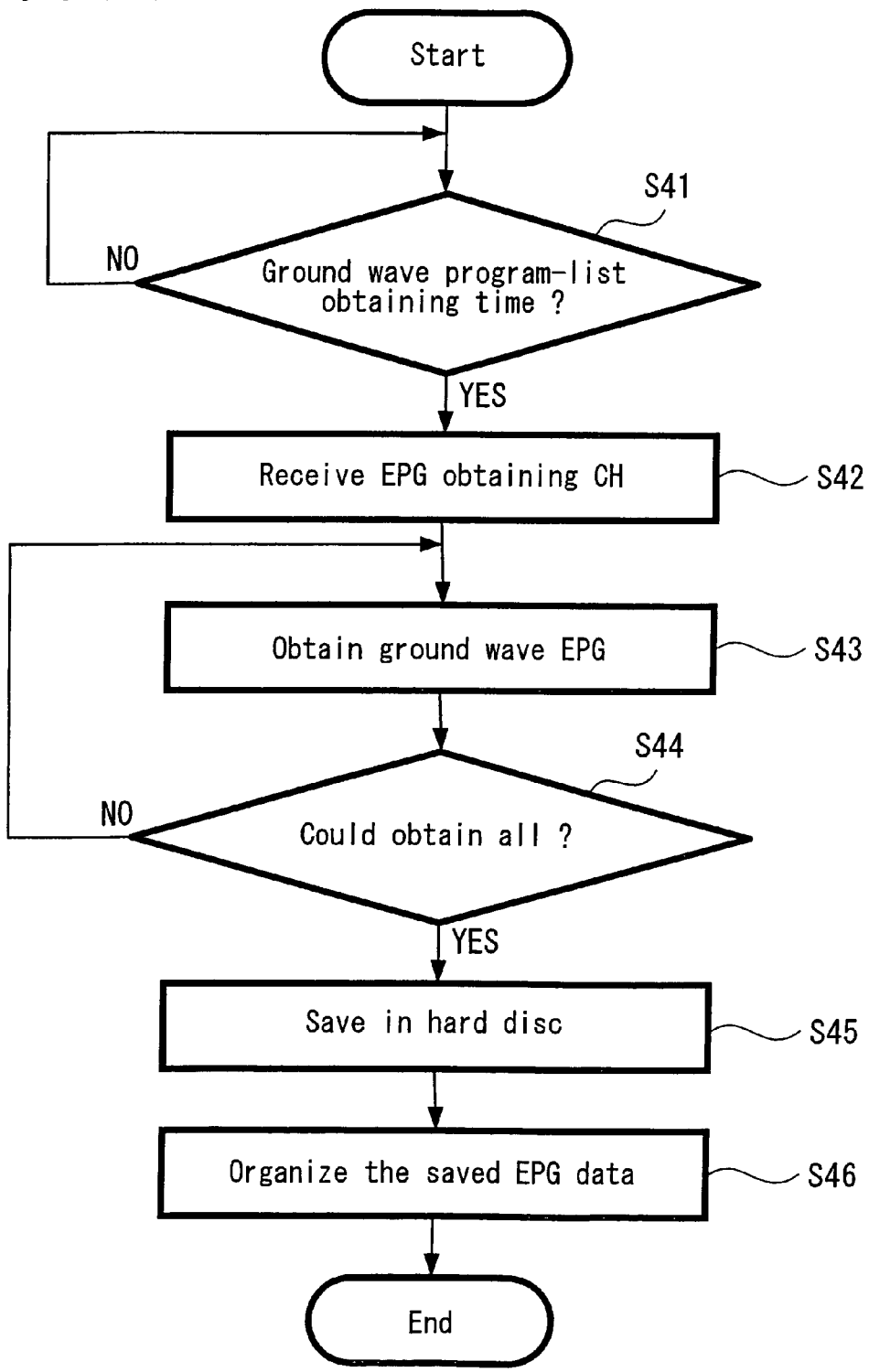
FIG. 7 is a flowchart showing a process for obtaining a program table for ground wave broadcasts according to one example of the present invention.

It should be noted that the EPG data obtaining process shown in the flowchart of FIG. 7 is a process for obtaining the EPG data added to the broadcast data of the ground wave. However, the hard disc recording and reproducing apparatus 100 of this example is configured to be able to be connected to the internet so that it is also possible to access a predetermined server by way of the internet and to download and store the EPG data from the server. The video-recording reservation and the like may be executed as described hereinafter regardless of whether the EPG data is obtained by way of the internet or from the broadcast wave. However, detailed program guide information is necessary in order to perform a keyword search as described hereinafter and it is therefore preferable to utilize EPG data composed of more detailed data.

Figure 8:
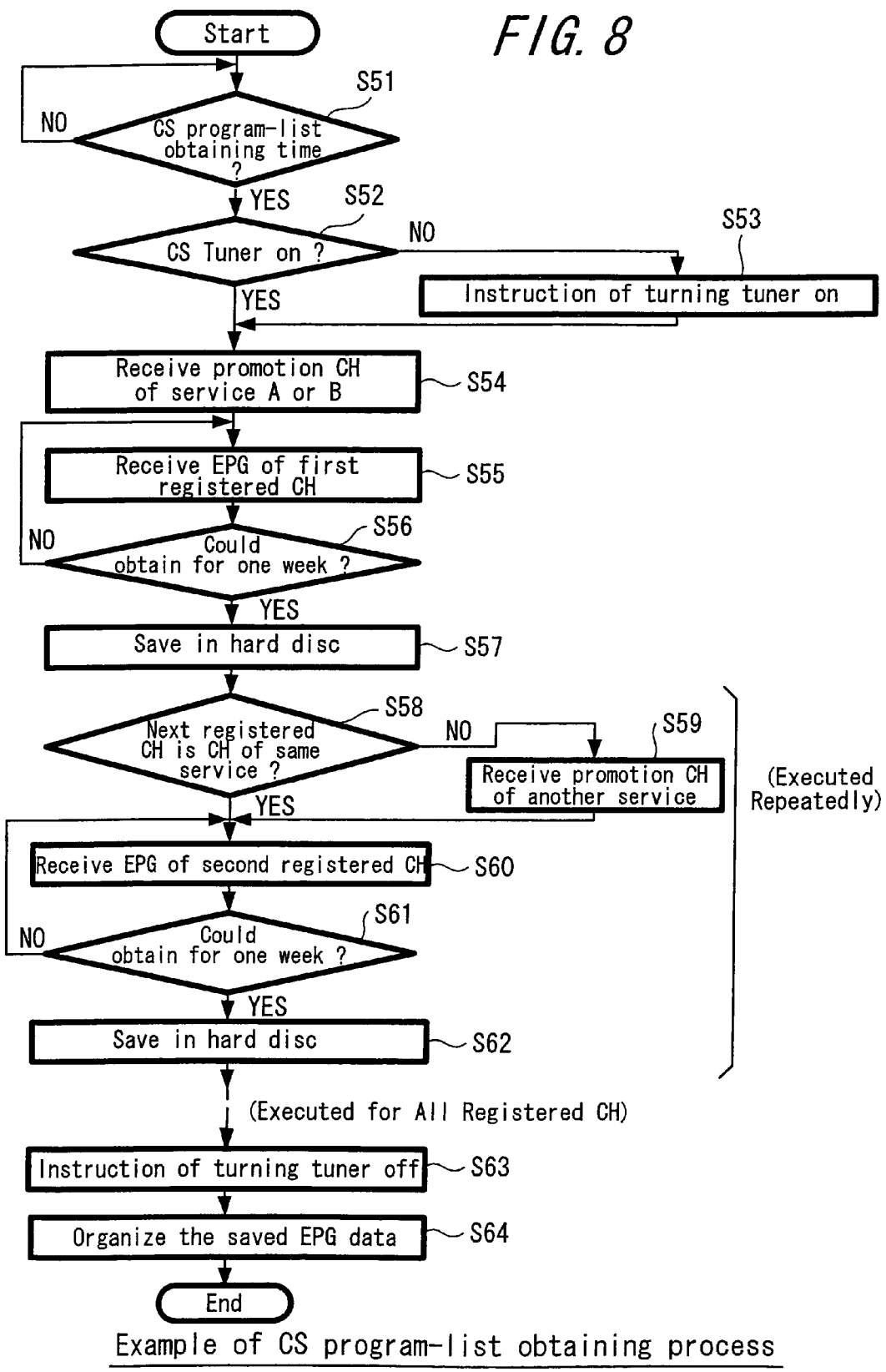
FIG. 8 is a flowchart showing a process for obtaining a program table for CS broadcasts according to one example of the present invention.

Next, a process for obtaining the EPG data of the CS broadcast under the control of the controller 121 will be explained with reference to the flowchart of FIG. 8.

The controller 121 first determines whether a time has arrived for obtaining the EPG data of the CS broadcast based on the time counted by the clock unit 124 (step S51). If such a time has not yet arrived, the controller 121 waits until such a time has been reached. If it is determined that a time for obtaining the EPG data of the CS broadcast has arrived, the controller 121 determines whether the power supply of the connected CS tuner apparatus 200 is presently on (step S52), and if the power supply of the CS tuner apparatus 200 is not on, it transmits an instruction to the CS tuner apparatus 200 to turn on the tuner (step S53). It should be noted that if the power-on state of the CS tuner apparatus 200 can be detected by communication with the CS tuner apparatus 200, the detecting process may be performed in this way. Also, if the state of the CS tuner apparatus 200 cannot be detected, a power-on state is assumed when received data and the like are currently being supplied from the CS tuner apparatus 200, and a power-off state is assumed when received data are not currently being supplied. Further, the processes in steps S52 and S53 are not necessary if the power supply of the CS tuner apparatus 200 is set as non-cooperation.

After it is determined in step S52 that the power supply is on or an instruction to turn on the power supply has been transmitted in step S53, an instruction is transmitted for changing-over the channel to receive the promotional channel of the service A or the service B which was registered beforehand (step S54). The received service here is a service which a channel having the smallest channel number belongs to supposing that, for example, the registered receiving channels are to be received sequentially beginning with the channel having the smallest channel number. The following explanation will be made assuming that the receiving is done in channel number order. When a CS tuner is connected which requires a satellite changing-over operation, a channel changing-over instruction must be transmitted after a satellite changing-over instruction has been transmitted to a desired satellite. It should be noted that if satellite information from the previous time the satellite changing-over instruction was performed has been stored in a memory or the like connected to the controller 121, it is possible to transmit the satellite changing-over instruction only when it is determined that the satellite changing-over is necessary according to that information.

Consequently, a process for obtaining the EPG data with respect to the channel having the smallest channel number is performed (step S55), and it is determined whether the electronic program guide data from the current day until one-week later could be obtained with respect to that channel number (step S56). In order to obtain the electronic program guide data for one week with respect to one channel, approximately one minute, for example, is needed and the obtaining process is performed in step S55 until the electronic program guide data for one week with respect to the channel can be obtained. If the electronic program guide data for one week with respect to the channel could be obtained, such data are saved in the hard disc (step S57).

It is next determined whether the next smallest channel number in the registered receiving channels corresponds to the same broadcast service as the channel number for which the EPG data has just been obtained (step S58), and if it is a different broadcast service, the channel is changed over to receive a promotional channel of another broadcast service (step S59). When a CS tuner is connected which requires a satellite changing-over operation, the channel changing-over instruction must be transmitted after the satellite changing-over instruction has been transmitted.

If it is determined in step S58 that the next smallest channel number corresponds to the same broadcast service, or after the process in step S59 has been performed, a process is performed for obtaining the EPG data with respect to the channel to be obtained at that time (step S60), and it is determined whether the electronic program guide data from the current day until one-week later could be obtained with respect to that channel number (step S61). If the electronic program guide data for one week could be obtained with respect to the channel, such data are saved in the hard disc (step S62).

The processes from step S58 to step S62 are performed repeatedly so long as there is another channel which is registered to be received. According to this example, the number of channels of the CS broadcast which can be registered is a maximum of 20 channels, so that the EPG data obtaining process is performed a maximum of 20 times. If the EPG data with respect to all registered channels could be obtained and could be saved in the hard disc, an instruction to turn the power supply off is transmitted to the CS tuner apparatus 200 (step S63) and the CS tuner apparatus 200 is placed in a standby state. However, the process in step S63 is not necessary if the power supply of the CS tuner apparatus 200 is set as non-cooperation.

Thereafter, the EPG data saved in the hard disc is organized as data which can be easily utilized in the hard disc recording and reproducing apparatus 100 (step S64), and the EPG data obtaining process of the CS broadcast is ended. Supposing that approximately one minute is necessary for obtaining the EPG data with respect to one CS channel, a maximum of about 20 minutes will be needed to receive the EPG data for the maximum of 20 requested channels. Thereafter, for example, approximately 10 minutes are needed to organize the data in step S64, so that a duration of approximately 30 total minutes will be needed to obtain the EPG data of the CS broadcast.

Figure 17:
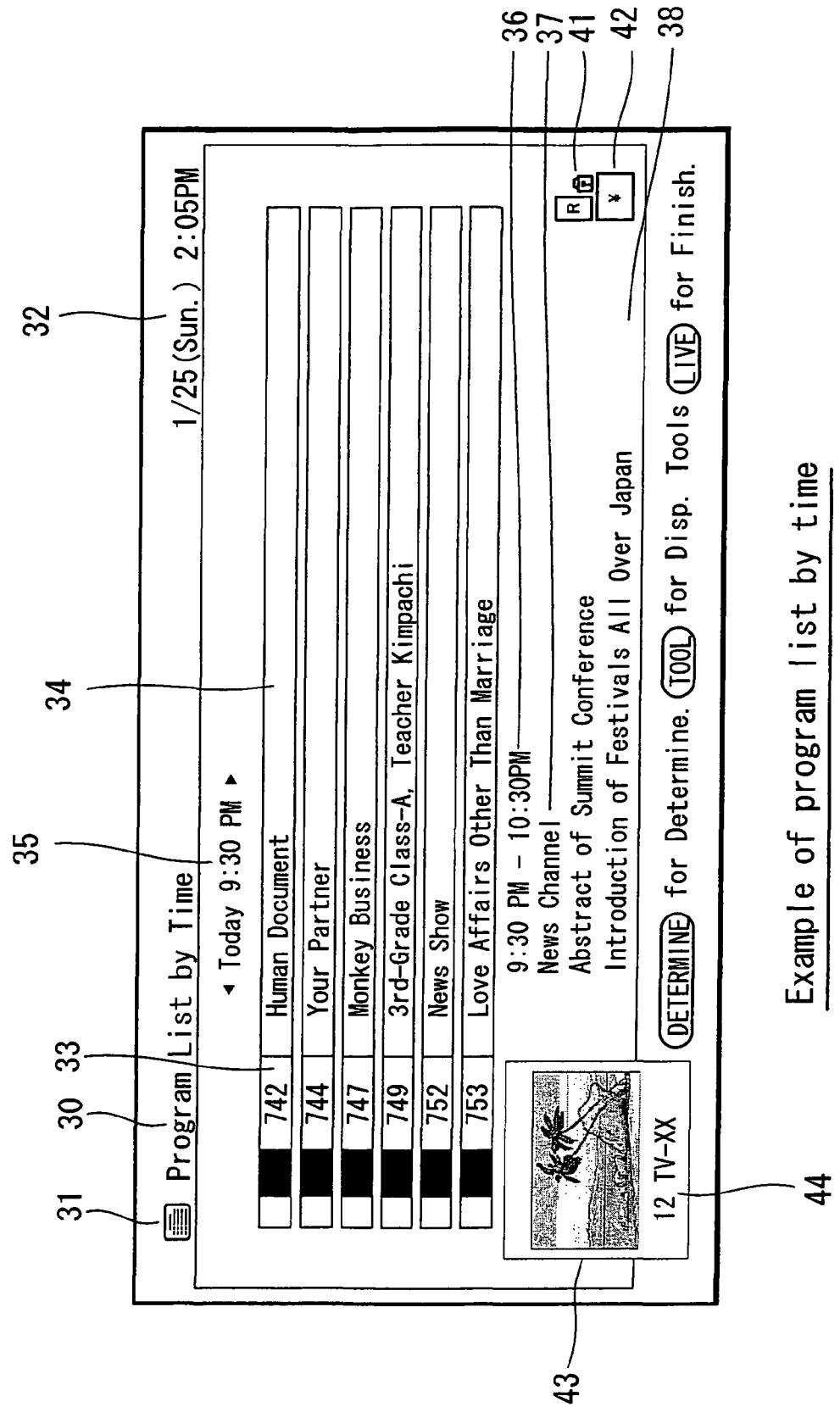
FIG. 17 is an explanatory diagram showing the display of a program table classified by time according to one example of the present invention.
Figure 18:
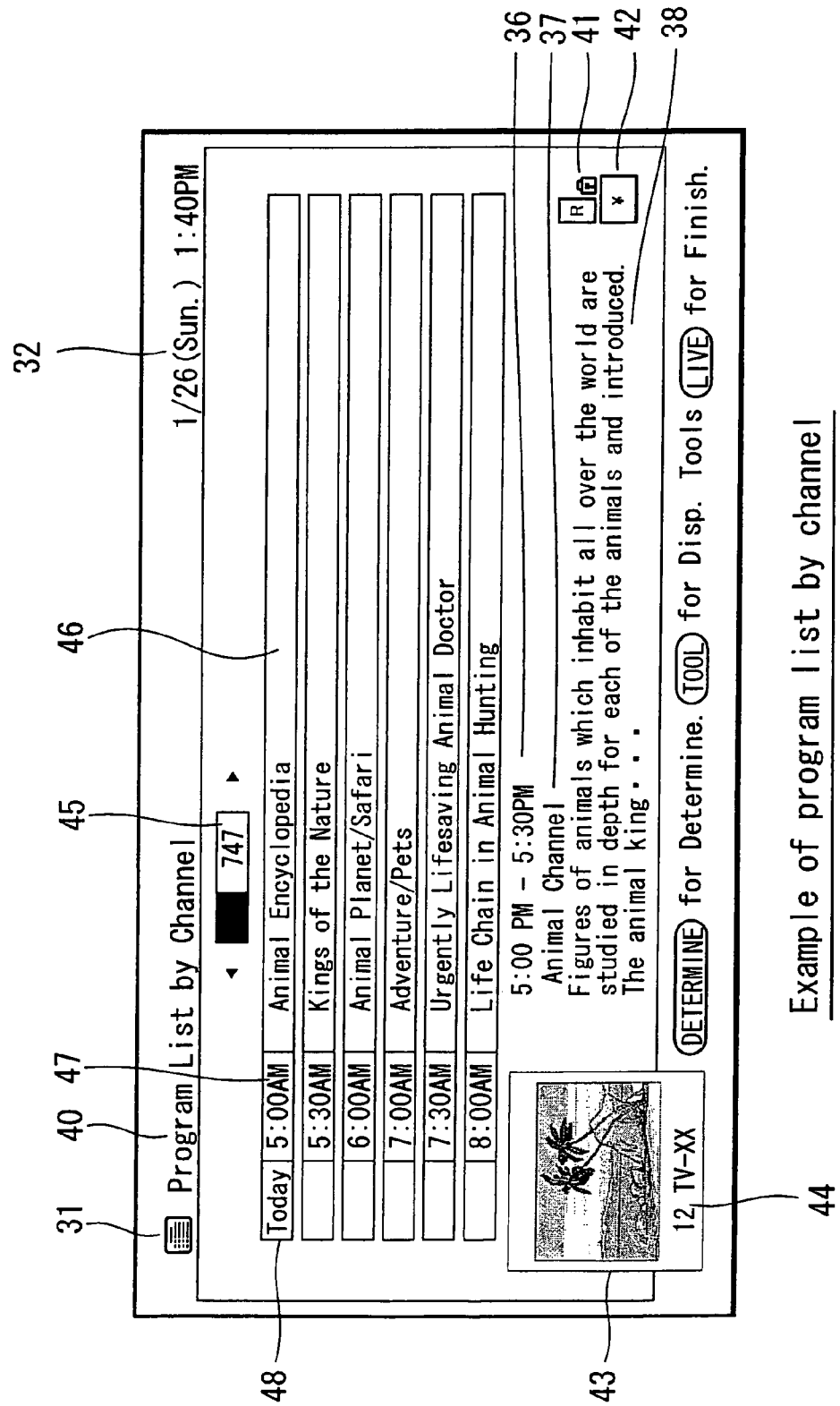
FIG. 18 is an explanatory diagram showing the display of a program table classified by channels according to one example of the present invention.
Figure 19:
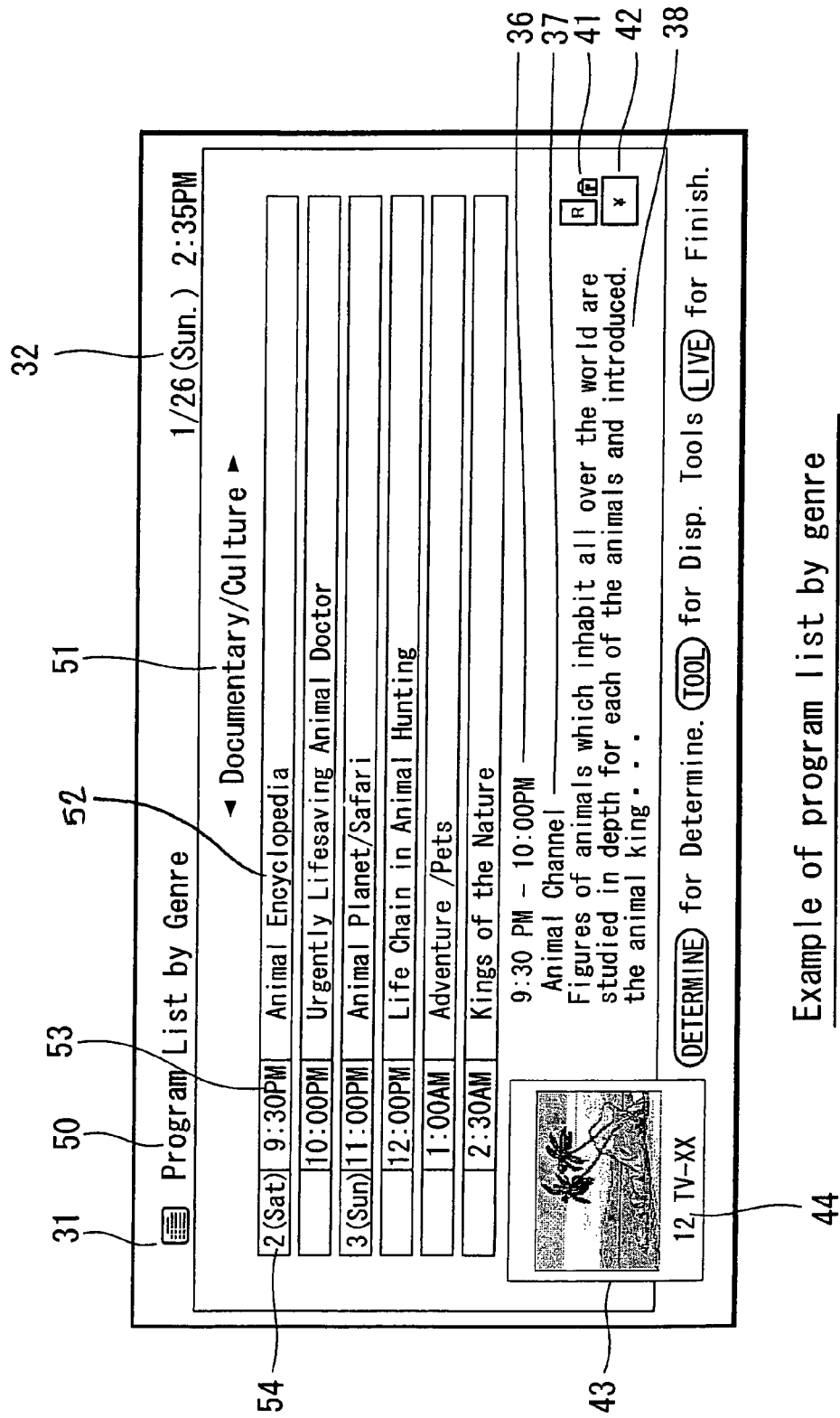
FIG. 19 is an explanatory diagram showing the display of a program table classified by genre according to one example of the present invention.

FIGS. 17 to 19 are case examples where program guides are displayed on the receiver 300 according to the EPG data obtained in this manner. FIG. 17 is shown as an example which displays a program guide classified by time, FIG. 18 is shown as an example which displays a program guide classified by channel display and FIG. 19 is shown as an example which displays a program guide classified by genre. According to the examples of FIGS. 17 to 19, program guides with respect to the CS channel are shown, but it is possible to form various similar displays with respect to the ground wave channels. Alternatively, it is possible to display a program guide classified by time and a program guide classified by genre in which the ground wave programs and the CS broadcast programs are mixed. Also, FIGS. 17 to 19 are shown as examples of program guides at one specific time point, but it is possible to display program guides for any time until one week later according to a user input, because the EPG data for one week were stored according to this example.

The display example of the program guide classified by time shown in FIG. 17 includes a display 30 shown as a "program list by time", a mark 31 indicating the present operating state of the hard disc recording and reproducing apparatus, a present time display 32, a list 33 of channel numbers at an appointed time, a list 34 of program names for each channel, and a display 35 of the broadcast time which is displayed by that program guide. It is possible to change the display of lists 33 and 34 relating to the programs to those of other channels by performing a user operation to scroll the display screen.

As also shown in FIG. 17, details of the selected program are displayed at the bottom of the screen. More specifically, a broadcast time display 36 of the program, a broadcasting station name display 37, a display 38 of the program content and the like are provided according to the EPG data with respect to the selected program in the displayed list. Further, if the selected program is one where an age limit of viewers is necessary, a display 41 indicating this limitation by a mark may be provided. Also, a display 42 may be provided indicating with a mark a program (so-called pay per view program) for which a billing process is necessary for each program (or each day).

If a video-record reservation of a program for which the display 41 indicates that there is an age limit is to be carried out in a condition that the age limit of viewers is locked at the CS tuner apparatus 200, it is necessary to perform a release operation of the age limit at the tuner apparatus 200. Also, if a video-record reservation is to be carried out for a program for which the display 42 indicates that a billing process is necessary, it is necessary to perform a billing operation at the tuner apparatus 200. It is possible to carry out these operations using a remote control by transmitting instructions for the release of the age limit or for the billing operation from the hard disc recording and reproducing apparatus 100.

As also shown in FIG. 17, a reduced display 43 of the video which is presently being received by the ground wave tuner 101 installed in the hard disc recording and reproducing apparatus 100 is provided on the left lower side of the screen according to this example. The receiving channel number and the broadcasting station name for the video are simultaneously shown by a display 44.

The display example of a program guide classified by channel shown in FIG. 18 includes a display 40 shown as "program list by channel", a mark 31 indicating the present operating state of the hard disc recording and reproducing apparatus and a present time display 32 in this example. Then, a program name display 46 by time relating to the input channel, a list 47 of the broadcast start times for the respective programs and a date display 48 are provided. The detailed displays 36, 37 and 38 are provided for a selected program in a manner similar to that of the program guide classified by time. Also, the age-limit display 41 and the billing display 42 for the program displayed in detail are provided when necessary. Further, the reduced display 43 of the video which is presently being received by the ground wave tuner 101 and the display 44 of the receiving channel number and the broadcasting station name for such video are provided.

In the display example of the program guide classified by genre shown in FIG. 19, the programs are classified by genre according to the genre data of the broadcast program shown as the EPG data and the genre input by the user, and are displayed in broadcast time order. In this example, the program guide includes a display 50 shown as "program list by genre", a mark 31 indicating the present operating state of the hard disc recording and reproducing apparatus and a present time display 32. Then, a genre display 51, a program name display 52 by time in that genre, a list 53 of the broadcast start times of the respective programs and a date display 54 are provided. The detailed displays 36, 37 and 38 are provided for a selected program in a manner similar to that of the program guide classified by time and the program guide classified by channel. Also, the age-limit display 41 and the billing display 42 for the program displayed in detail are provided when necessary. Further, the reduced display 43 of the video which is presently being received by the ground wave tuner 101 and the display 44 of the receiving channel number and the broadcasting station name for such video are provided.

If such a program guide is displayed, when the broadcast time of a selected program arrives after a video-record reservation for the selected program has been made, video recording to the hard disc starts automatically, and when the program ending time is reached, the video recording stops. In the case of a program of the CS broadcast, a channel change over in the CS tuner apparatus 200 is also executed.

Figure 20:
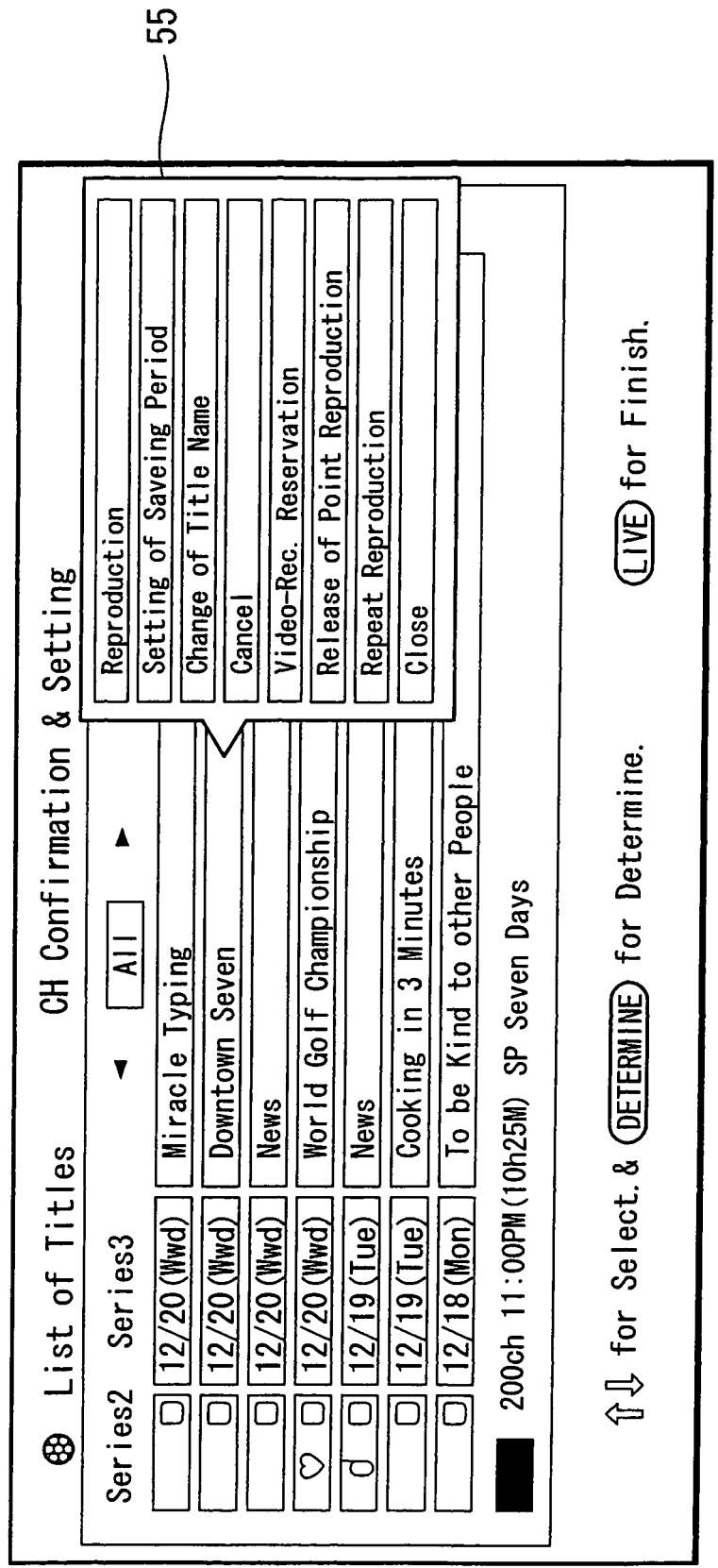
FIG. 20 is an explanatory diagram showing the display of a pop-up menu according to one example of the present invention;.

One input method for performing a video-record reservation is shown, for example, in FIG. 20. According to the method, a pop-up menu 55 having a list of programs, such as a program guide, is displayed and "video-record reservation" in the pop-up menu is selected. The pop-up menu includes displays such as "reproduction", "save period setting", "title name change", "cancel", "point reproduction release", "repeat reproduction" and "close" in addition to "video-record reservation", and the corresponding procedure can be performed by selecting the appropriate display. However, it is needless to say that procedures such as reproduction and canceling cannot be performed with respect to programs which have not yet been video-recorded. It is possible to change the form of the display for those procedures which cannot be performed as compared to the display for selectable procedures.

Figure 21:
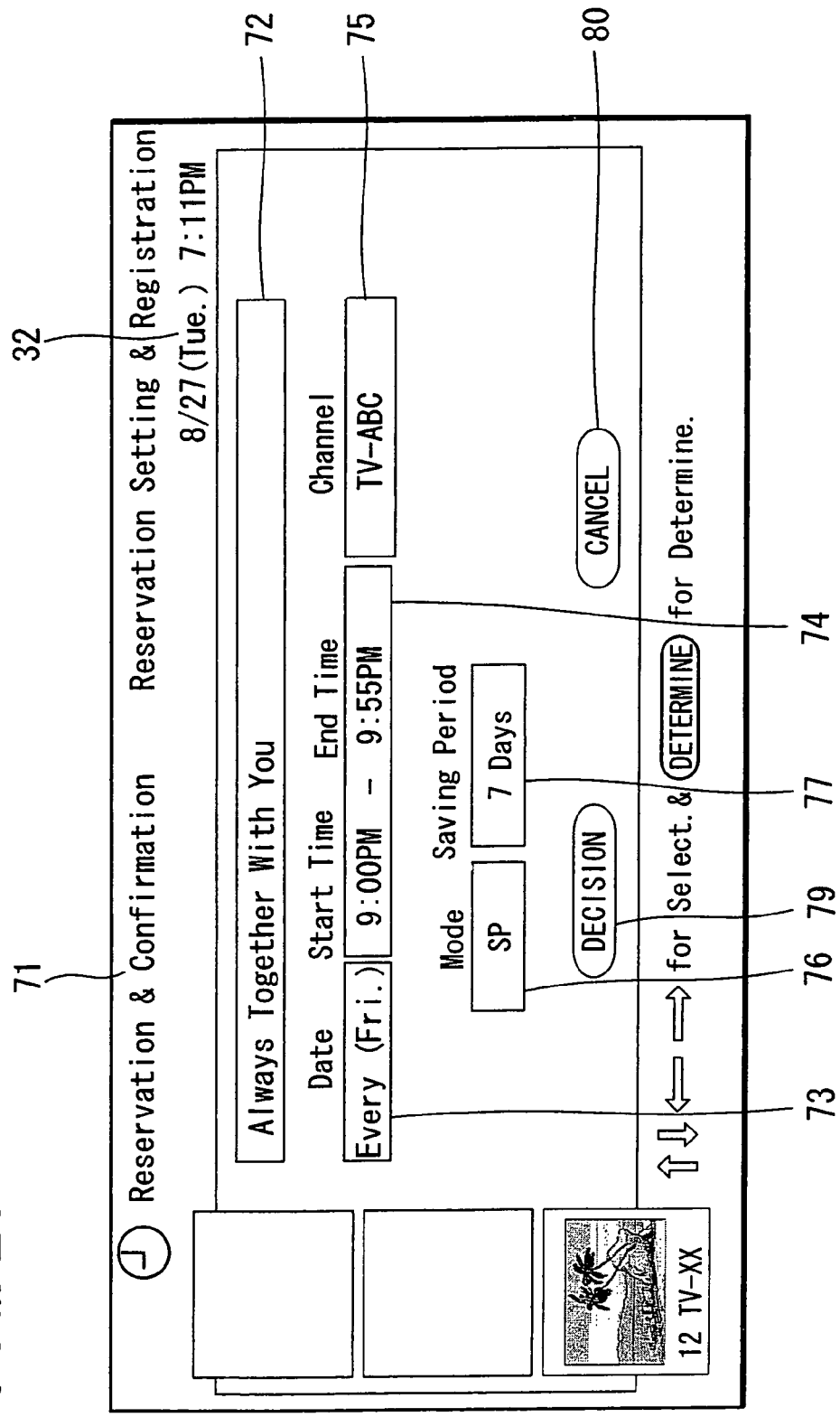
FIG. 21 is an explanatory diagram showing the display of a reservation screen according to one example of the present invention.

FIG. 21 is a diagram showing a display example of a reservation screen. If a specific program is searched out in a program guide or the like and a video-record reservation is set for the program, a reservation screen is displayed, for example, as shown in FIG. 21. In this reservation screen, there are a display 71 showing that a reservation/confirmation will be performed, a present time display 32, a display 72 of the title of a program to be recorded, a display 73 of the date the program is to be recorded, a display 74 for the start time and the end time of the program, a display 75 of the program channel (broadcasting station name), a video-record mode display 76 and a display 77 of the length of time the video-recorded program is to be saved. With respect to the recording date, it is possible to set only one specific day on which the program is broadcast, but it is also possible to set various patterns of dates such as the same day of every week, every day and every day excluding Sunday. When setting the broadcast day, it is enough to set the display of the date obtained from the EPG data directly, but a user operation is necessary when setting other patterns.

Then, when a decision button 79 is selected after executing an input and a confirmation with respect to each item, the displayed reservation will be set. Also, when a cancel button 80 is selected, the displayed reservation will be cancelled.

One form of reservation which may be made for the hard disc recording and reproducing apparatus 100 according to this example is a series reservation. A series reservation as used herein is a process for video-record reserving in one operation programs such as, for example, dramas which are broadcast every week in a continuing series.

Figure 22:
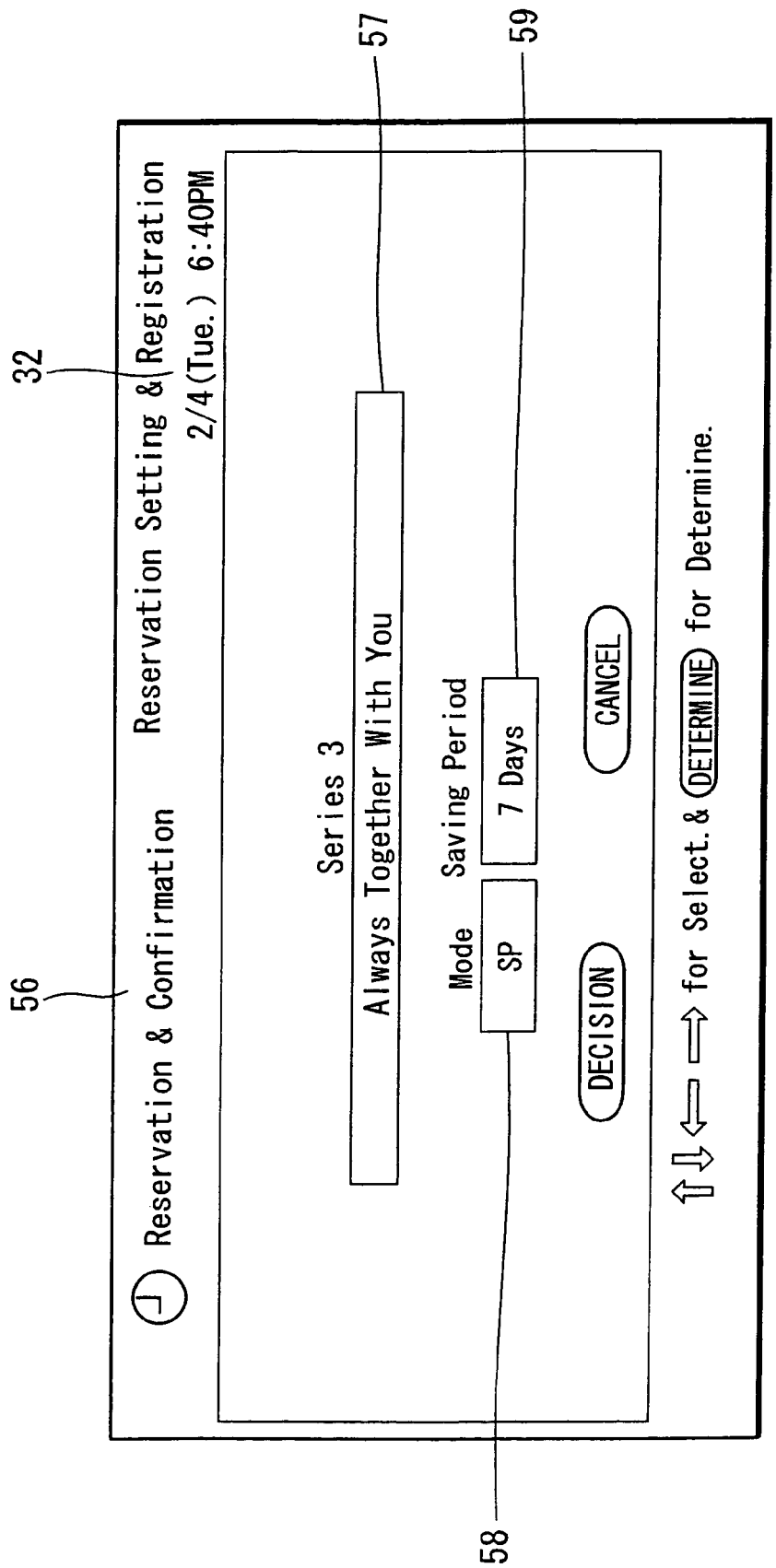
FIG. 22 is an explanatory diagram showing the display of a series reservation screen according to one example of the present invention.

FIG. 22 is an example of a display screen in a case when a series reservation is to be set. In the case of this series reservation, there are provided a display 56 showing that a reservation/confirmation will be performed, a present time display 32, a display 57 of the title of a program to be reserved, a recording mode display 58 and a display 59 of the length of time the recorded program is to be saved.

Figure 23:
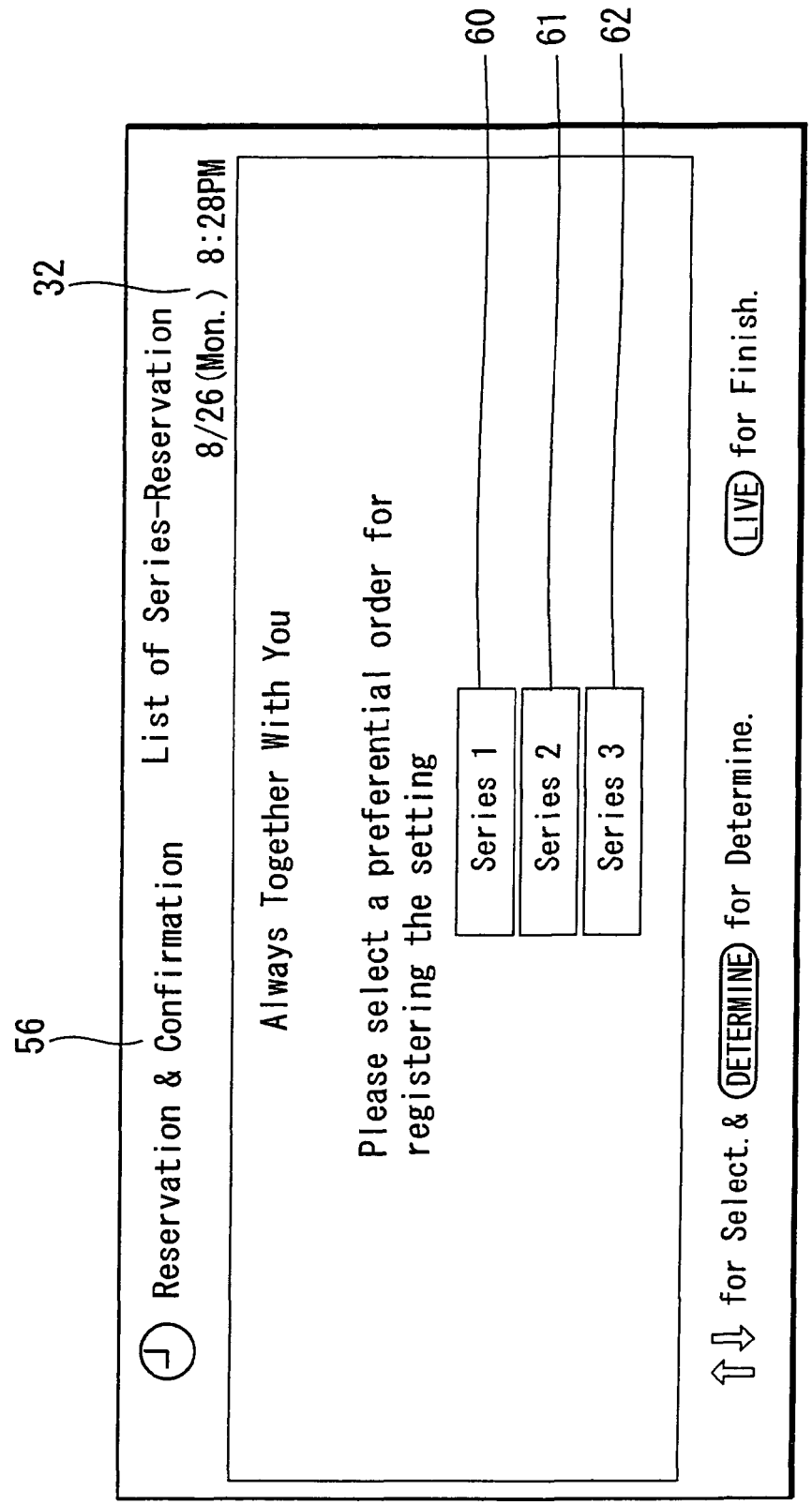
FIG. 23 is an explanatory diagram showing the display of a series reservation screen according to one example of the present invention.

In the case of this example, it is necessary to determine a preferential order when setting the series reservation. More specifically, it is possible to make a video-record reservation for three series in the hard disc recording and reproducing apparatus 100 according to this example, and the reservations of series 1, series 2 and series 3 can be set sequentially in an order of preference. FIG. 23 is a diagram showing a display example of a screen in which the preferential order of the series reservation will be determined. The screen includes three displays 60, 61 and 62 for series 1, series 2 and series 3, respectively, and the order of the series is selected therein by a user operation.

Figure 24:
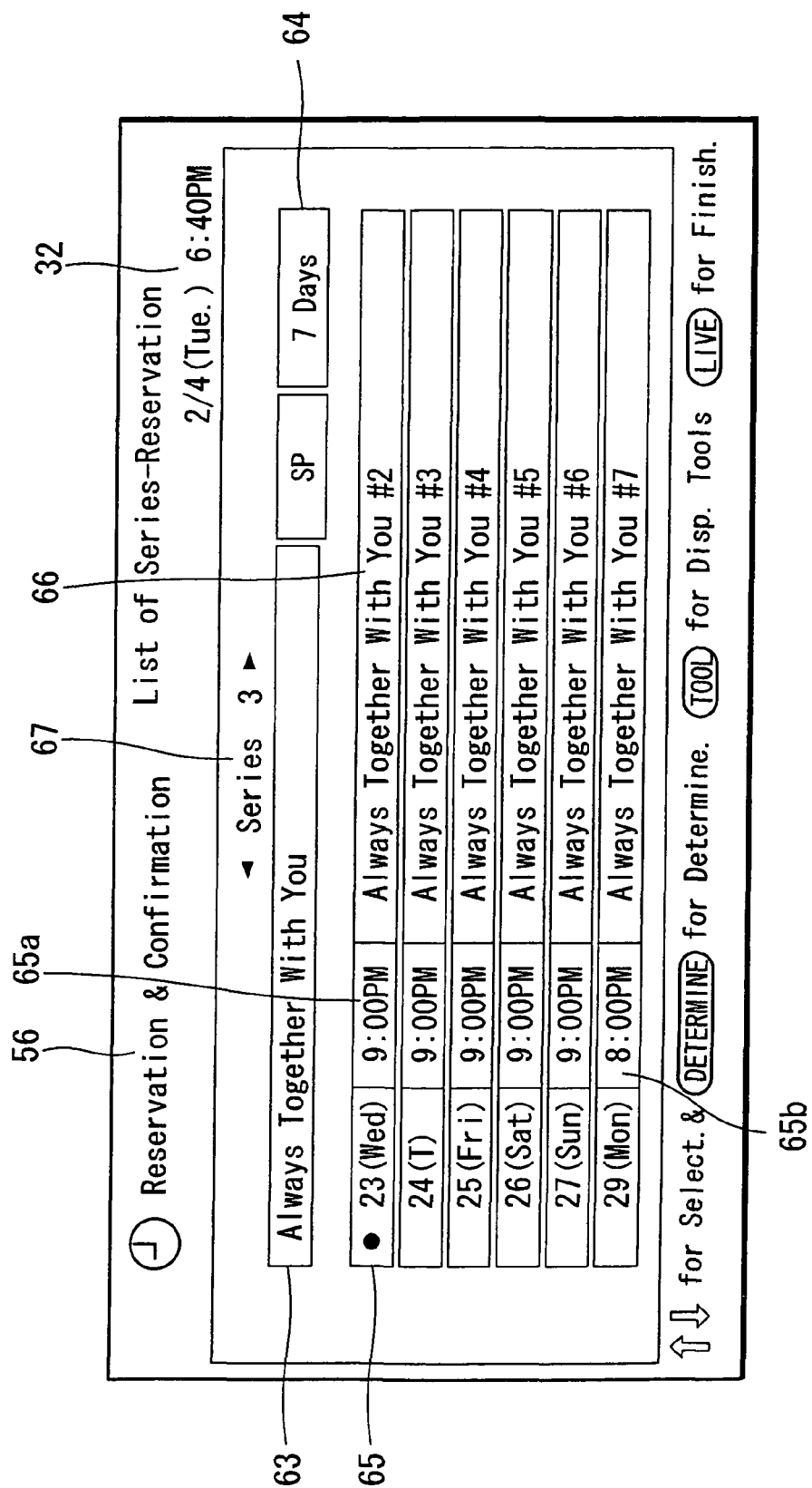
FIG. 24 is an explanatory diagram showing the display of a list of reserved programs in a series reservation according to one example of the present invention.

When such a series reservation is performed, a list of the programs which were series-reserved is displayed as shown in FIG. 24. Programs having the same title as the series-reserved program are searched out according to the EPG data, and a list of the searched out programs is displayed. In the example of FIG. 24, there are provided a display 63 of the series-reserved program names, a display 64 of the length of time the recorded programs are to be saved, and a display 67 for indicating which of the reserved series is displayed. Then, there are a display 65 of the broadcast dates and a display 66 of the program names as a list of the programs searched out according to the EPG data. Here, data of the broadcast times (indications such as #2, #3) are displayed by adding them at the end of the program name.

When a series video-record reservation is performed in this manner, a video-record reservation is performed automatically if the corresponding program is searched out by the EPG data. It should be noted with respect to the automatic video-record reservation that there are other processes than this series reservation such as, for example, a process for reserving by searching out the program automatically according to a keyword input by users and a process for reserving automatically with respect to programs in the genre which was set beforehand. The programs which become candidates when an automatic video-record reservation is performed are only programs on the channel which was set in steps S16 and S19 shown in the flowchart of FIG. 4 and selected as an automatic video recording channel, and a process for searching out a candidate program from a channel which was not selected as an automatic video recording channel is not performed.

In this manner, channels for executing the automatic video recording can be set freely by a user operation beforehand, so that if channels including programs desired by users are pre-set, the possibility for automatically video-record reserving such programs is high and it is possible to perform the automatic video-record reservation with sufficient accuracy. In this case, the setting for performing the automatic video recording is different from the channel setting of a channel for obtaining EPG data and/or of receivable channels, so that it is possible to perform the automatic video recording in a better condition. Also, the automatic video-recording of a channel with bad reception can be avoided by excluding such channels beforehand from the automatic video-recording channels.

It should be noted that with respect to the setting of the channel for which the automatic video-record reservation is performed, all processes for performing the video-record reservation automatically are set at once here, but it is possible for channels for which automatic video-record reservations are executed individually corresponding to each mode to be set minutely, for example, just like the channel setting for performing the automatic series video-record reservation and the channel setting for performing the automatic reservation according to a keyword search.

It should be noted that in the examples mentioned above, examples to be applied to a recording and reproducing apparatus which uses a hard disc as a recording medium were mentioned, but it is possible to apply the examples to a recording apparatus which uses another of various recording (storing) media.

Also, with respect to the tuner installed in the recording and reproducing apparatus, a tuner for receiving a television broadcast of an analog ground wave is used in the examples mentioned above, but it is possible to use a tuner of another receiving form such as, for example, a tuner receiving a digital ground wave. Also, a tuner for receiving CS broadcasts was configured as a separate body from the recording apparatus, but it is possible to configure a tuner which receives channels other than those of the built-in tuner for receiving CS broadcasts or the like as a one-body configuration with the recording apparatus such as a hard disc recording apparatus. It is possible to use a tuner for receiving BS broadcasts instead of a tuner for receiving CS broadcasts. Alternatively, it is possible to use a tuner for receiving both CS broadcasts and BS broadcasts.

Also in the examples mentioned above, the video signal and the audio signal which were converted to analog signals were transmitted between the separately provided tuner and the recording and reproducing apparatus, but it is possible to transmit digital video data or audio data received by the tuner directly to the recording and reproducing apparatus to be recorded therein.

Also in the examples mentioned above, a separately provided television receiver is connected to a recording and reproducing apparatus, but it is possible to install a recording and reproducing apparatus within the television receiver.

Further, instead of the exclusive tuner and the recording apparatus as in the example mentioned above, it is possible to use, for example, a recording (storing) apparatus of a high-capacity which corresponds to the recording apparatus in this example and a board, a card or the like which performs a receiving process corresponding to the tuner. These components may be mounted (connected) to a personal computer which performs various data processes in order to perform similar video-record processes (record processes) using software (programs) for obtaining the EPG data and for performing the control of the recording process.

Also in the examples mentioned above, the reception and video-recording of a general television broadcast was explained, but it is possible record other broadcast data of, for example, a radio broadcast or one of various data broadcasts or the like according to a similar process of obtaining the EPG data.

According to the present invention, it is possible to obtain program data for only limited channels of the received broadcast service. In the case of, for example, a broadcast service where many channels exist, it takes a long time to receive and obtain all of the program data in the service. However, by obtaining the program data of only the limited channels, it does not take as much time to store the program data. The fact that it does not take as long to store the program data also means that the possibility that the reception of the broadcast program itself will overlap with the reception of the program data is reduced, so that the possibility of recording the broadcast program or the like according to the program data without an obstacle is increased. Also, with respect to the memory capacity of the memory which saves the obtained program data, a lower memory capacity is needed because the number of channels for the program data is limited, so that it is possible to reduce the load on the apparatus.

In this case, since the program data are data added to the broadcast data which are transmitted by the broadcast service, it is possible for the program data to be obtained simultaneously with the reception of the broadcast data with a simple construction and easily in a short period.

Further, since the channels for receiving the channels to which the program data are added were set variably for obtaining the program data, it is easy to deal with a change at the broadcast service, such as a change of a so-called promotional channel.

Also, since the program data are data which are received through another transmission path than that of the broadcast data transmitted by the broadcast service, it is possible to similarly process the program data received through the internet or the like.

In addition, since a record reservation of a program which is broadcast through a stored channel is performed according to the program data of the stored channel, the process for the record reservation can be performed efficiently.

Also, since channels to be record-reserved automatically are limited to specific channels in the channels for which program data are stored by record-reserving the specific program detected from the program data automatically as a record reservation according to a preset condition, the channel for which a record is reserved automatically can be set according to a user's preference in addition to the channels which will be displayed by obtaining the program data, so that it is possible to perform a so-called automatic record efficiently. For example, channels through which programs of genres preferable to a user are broadcast many times are set as channels to be record-reserved automatically, and channels through which programs of these genres are seldom broadcast are excluded from the channels to be record-reserved automatically. As a result, it is possible to reduce the possibility for automatically recording programs which are not so meaningful for the user and to perform an effective automatic record. Further, since such a display can be performed with respect to the program data by obtaining them and at the same time a record reservation by a user operation can be performed after confirming the display of the program guide even for the channels not to be record-reserved automatically, the usability for the users is not lessened by limiting the number of channels for the automatic record.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A program data processing method, comprising:
   receiving, for each one of a plurality of broadcast channels, a user selection regarding whether to allow or not allow automatic recording for that broadcast channel;
   obtaining program guide data associated with each one of the plurality of broadcast channels by sequentially obtaining, from program guide data carried over a single specific program guide obtaining channel, the program guide data relating to only one of the plurality of broadcast channels at a time, the program guide obtaining channel being set by the user from among a plurality of alternative program guide obtaining channels, and the program guide data being obtained at a time specified by the user;
   storing the received program guide data;
   determining, from the stored program guide data, whether any of the plurality of broadcast programs coincides with a predetermined condition; and
   when a particular one of the plurality of broadcast programs coincides with the predetermined condition,
   automatically performing recording reservation of the particular broadcast program based on the stored program guide data upon a channel providing the particular broadcast program being one of the channels previously selected by the user to allow automatic recording, and
   displaying on a display the stored program guide data relating to the particular broadcast program and receiving a user selection to record the particular broadcast program upon the channel providing the particular broadcast program being one of the channels previously selected by the user to not allow automatic recording,
   wherein when the time specified by the user for obtaining guide data is a time for obtaining guide data for ground wave broadcasting the time is selected from among a multiple of predetermined times, and when the time specified by the user for obtaining guide data is a time for obtaining guide data for satellite broadcasting the time is selected from among a multiple of times that do not overlap with the multiple of predetermined times for obtaining the guide data for ground wave broadcasting,
   wherein after the time for obtaining guide data has been specified, it is determined whether or not there is a recording reservation that has a time overlapping with the time for obtaining guide data, and when there is an overlap an indication of the overlap is displayed.

2. A program data processing method according to claim 1, wherein the program guide data are added to broadcast data of a specific channel transmitted by a broadcast service.

3. A program data processing method according to claim 2, wherein the specific channel having the program data added thereto is variably set in order to obtain the program data.

4. A program data processing method according to claim 2, wherein software, including an instruction for variably setting the specific channel having the program data added thereto, is received.

5. A program data processing method according to claim 1, wherein the program guide data are received over a different transmission path than that used by the broadcast service.

6. A program data processing method according to claim 1, wherein the particular broadcast program is restricted to a predetermined channel.

7. A program data processing method according to claim 1, wherein the user selection regarding whether to allow or not allow automatic recording of a predetermined channel is preset using an input screen showing a channel number associated with the predetermined channel.

8. A program data processing apparatus, comprising:
   a selection receiving mechanism that receives, for each one of a plurality of broadcast channels, a user selection regarding whether to allow or not allow automatic recording for that broadcast channel;
   a program data obtaining mechanism that obtains program guide data associated with each one of the plurality of broadcast channels by sequentially obtaining, from program guide data carried over a single specific program guide obtaining channel, the program guide data relating to only one of the plurality of broadcast channels at a time, the program guide obtaining channel being set by the user from among a plurality of alternative program guide obtaining channels, and the program guide data being obtained at a time specified by the user;
   a memory that stores the received program guide data;
   a recording control mechanism that determines from the stored program guide data whether any of the plurality of broadcast programs coincides with a predetermined condition, and when a particular one of the plurality of broadcast programs coincides with the predetermined condition, automatically performs recording reservation of the particular broadcast program based on the stored program guide data upon a channel providing the particular broadcast program being one of the channels previously selected to by the user allow automatic recording; and
   a display that displays only the stored program guide data relating to the particular broadcast program upon the channel providing the particular broadcast program being one of the channels previously selected by the user to not allow automatic recording, the recording control mechanism thereby receiving a user selection to record the particular broadcast program, wherein when the time specified by the user for obtaining guide data is a time for obtaining guide data for ground wave broadcasting the time is selected from among a multiple of predetermined times, and when the time specified by the user for obtaining guide data is a time for obtaining guide data for satellite broadcasting the time is selected from among a multiple of times that do not overlap with the multiple of predetermined times for obtaining the guide data for ground wave broadcasting, wherein after the time for obtaining guide data has been specified, it is determined whether or not there is a recording reservation that has a time overlapping with the time for obtaining guide data, and when there is an overlap an indication of the overlap is displayed.

9. A program data processing apparatus according to claim 8, wherein the program data obtaining mechanism obtains the program guide data from data added to broadcast data of a specific channel transmitted by the broadcast service.

10. A program data processing apparatus according to claim 9, wherein the program data obtaining mechanism variably sets the specific channel from which the program guide data is obtained.

11. A program data processing apparatus according to claim 9, wherein the program data obtaining mechanism receives software including an instruction for variably setting the specific channel from which the program guide data is obtained.

12. A program data processing apparatus according to claim 8, wherein the program guide data are received over a different transmission path than that used by the broadcast service.

13. A program data processing apparatus according to claim 8, further comprising:
    a recording mechanism that records broadcast data input under the control of the recording control mechanism.

14. A program data processing apparatus according to claim 8, wherein the particular broadcast program is restricted to a specific channel.

15. A program data processing apparatus according to claim 8, wherein the user selection regarding whether to allow or not allow automatic recording of a predetermined channel is pre-set using an input screen showing a channel number associated with the predetermined channel.

* * * * *